United States Patent
Beeston et al.

(10) Patent No.: US 6,857,044 B2
(45) Date of Patent: Feb. 15, 2005

(54) DATA STORAGE DEVICE FOR FAST MULTIPLE FILE WRITE OPERATIONS

(75) Inventors: Ralph Thomas Beeston, Tucson, AZ (US); Kirby Grant Dahman, Tucson, AZ (US); Christopher Paul Grunow, Tucson, AZ (US); Joel Kenneth Lyman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 09/977,467

(22) Filed: Oct. 15, 2001

(65) Prior Publication Data

US 2003/0074521 A1 Apr. 17, 2003

(51) Int. Cl.⁷ .............................................. G06F 12/04
(52) U.S. Cl. ...................... 711/111; 711/112; 711/154; 360/49; 360/69; 360/71; 360/72.1; 707/3; 707/31
(58) Field of Search ............................. 360/49, 69, 71, 360/72, 1; 707/3, 31; 711/111, 112, 4; 1/154

(56) References Cited

U.S. PATENT DOCUMENTS

| 3,603,937 | A | * | 9/1971 | Loizides et al. ............ 707/101 |
| 3,984,814 | A | * | 10/1976 | Bailey et al. .................. 714/16 |
| 4,435,762 | A | * | 3/1984 | Milligan et al. ................ 710/6 |
| 5,485,321 | A | * | 1/1996 | Leonhardt et al. ............. 360/48 |
| 5,546,557 | A | * | 8/1996 | Allen et al. .................. 711/111 |
| 5,586,280 | A | * | 12/1996 | Simms ........................... 711/4 |
| 5,969,893 | A | * | 10/1999 | Basham et al. ................ 360/49 |
| 6,070,224 | A | * | 5/2000 | LeCrone et al. ............ 711/112 |
| 6,124,993 | A | * | 9/2000 | Hallamasek .................. 360/48 |
| 6,154,852 | A | * | 11/2000 | Amundson et al. ............ 714/5 |
| 6,173,359 | B1 | * | 1/2001 | Carlson et al. ............. 711/111 |
| 6,341,329 | B1 | * | 1/2002 | LeCrone et al. ............ 711/112 |
| 6,674,599 | B1 | * | 1/2004 | Rae et al. .................. 360/72.1 |

OTHER PUBLICATIONS

IBM, DFSMS/MVS Version 1 Release 4, GC26–4900–05, General Information, 1980, pp. 1–167.

* cited by examiner

*Primary Examiner*—T. Nguyen
(74) *Attorney, Agent, or Firm*—Dale F. Regelman

(57) ABSTRACT

A data storage device comprising a computer useable medium having computer readable program code disposed therein for writing information on a data storage medium using fast multiple file write operations. A data storage and retrieval system comprising one or more of Applicants' data storage devices. Computer program products embodied as program code stored in Applicants' storage device.

44 Claims, 20 Drawing Sheets

DATA STORAGE DEVICE FOR FAST MULTIPLE FILE WRITE OPERATIONS

FIELD OF THE INVENTION

Applicant's invention relates to a data storage device for fast multiple file write operations.

BACKGROUND OF THE INVENTION

Automated media storage libraries are known for providing cost effective access to large quantities of stored media. Generally, media storage libraries include a large number of storage slots in which are stored data storage media. The portable data storage media are typically housed in a portable container, such as a tape cartridge, an optical cartridge, and the like. One (or more) accessors typically access the data storage media from the storage slots and deliver the accessed media to a data storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy and/or improved performance.

What is needed, however, is a data management system, method, and apparatus and method to expedite the recording of information provided by a host computer onto a data storage medium, particularly where that information comprises a plurality of individual files.

SUMMARY OF THE INVENTION

Applicants' invention includes a method to dispose information on a sequential medium, such as a tape, using a data storage device. Applicants' method includes the steps of providing a first command instructing the data storage device to record information on a designated data storage medium, such as a magnetic tape, providing that information to the data storage device, removeably disposing that designated data storage medium in the data storage device, moving that data storage medium in a first direction, recording the information on the moving data storage medium, issuing a deferred conditional write tape mark command, and setting a deferred conditional tape mark indicator.

Applicants' invention further includes a data storage device which includes a computer useable medium having computer readable program code disposed therein for disposing information on a data storage medium removeably disposed in that data storage device. Applicants' invention further includes a data storage and retrieval system comprising a computer useable medium having computer readable program code disposed therein for disposing information on a data storage medium using a data storage device, wherein that data storage and retrieval system comprises a library controller, at least one data storage drive, at least one portable data storage medium, and at least one host computer which provides information to Applicants' data storage device.

Applicants' invention further includes a computer program product usable with a programmable computer processor having computer readable program code embodied therein for disposing information on a tape medium using Applicants' data storage device. Applicants' invention further includes a computer program product usable with a programmable computer processor having computer readable program code embodied therein for disposing information on a tape medium using a data storage device disposed in Applicants' data storage and retrieval system.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to record information to a movable tape medium, or to a movable tape medium disposed within a portable data storage cartridge is not meant, however, to limit Applicant's invention to either data storage and retrieval systems, or to magnetic tape applications, as the invention herein can be applied to data storage media in general.

Figure 3:
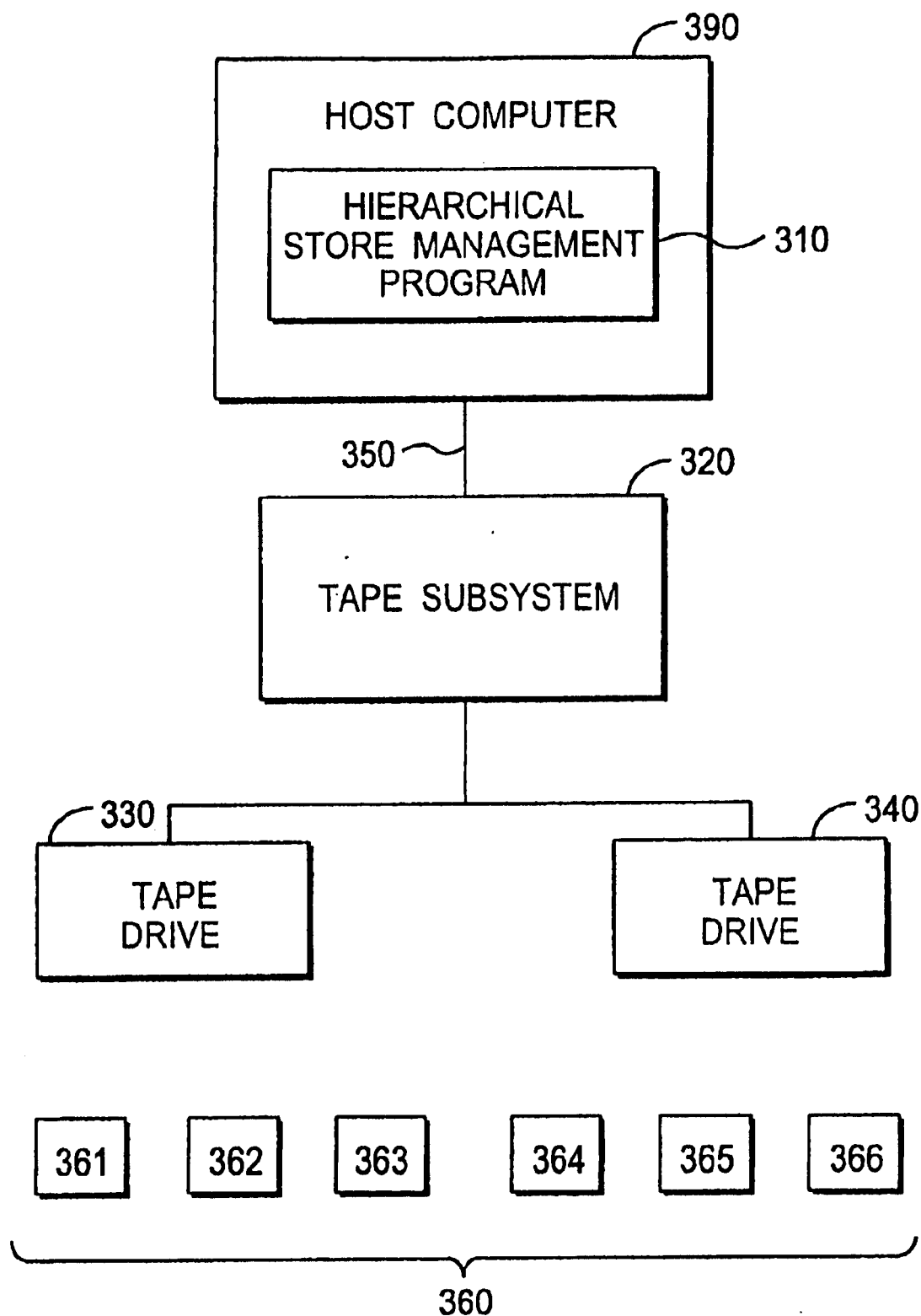
FIG. 3 is block diagram showing the components of Applicants' data storage and retrieval system.

FIG. 3 illustrates the hardware and software environment in which preferred embodiments of the present invention are implemented. Host computer 390 includes, among other programs, Applicants' hierarchical storage management (HSM) program 310. Host computer 390 comprises one or more mainframe computers, one or more personal computers, and/or combinations thereof.

Information is transferred between the host system 390 and secondary storage devices managed by a data storage and retrieval system, such as tape subsystem 320, via communication link 350. Communication link 350 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, tape subsystem 320 includes tape drives 330 and 340. In other embodiments of Applicants' data storage and retrieval system, tape subsystem 320 includes a single data storage drive. In alternative embodiments, Applicants' data storage and retrieval system 320 includes more than two data storage drives.

A plurality of portable data storage media 360 are stored within Applicants' data storage and retrieval system. In certain embodiments, plurality of data storage media 360 are each housed in a portable data storage cartridge 370, such as plurality of portable tape cartridges 370 (not shown in FIG. 3). Each of such portable data storage cartridges may be inserted in one of tape drives, and thereafter accessed by the tape subsystem 320. In alternative embodiments, alternative storage media may be substituted for the tape cartridges 370. Any type of sequential storage media supporting a sequential access command architecture could be used.

The tape subsystem 320 further includes program logic to manage tape drives 330 and 340, and plurality of tape cartridges 370. In alternative embodiments, tape subsystem 330 and host system 390 may be located on a single computer machine.

Host system 390 comprises a computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The HSM program 310 in the host system 390 may include the functionality of HSM type programs known in the art that manage the transfer of data to a tape library, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known HSM functions, such as recall and migration, the HSM program 310 would further include additional program instructions to perform the operations of the preferred embodiments of the present invention. The HSM program 310 may be implemented within the operating system of the host system 390 or as a separate, installed application program.

The tape subsystem 320 comprises a computer system, and manages a plurality of tape drives and tape cartridges. The tape drives 330 and 340 may be any suitable tape drives known in the art, e.g., the Magstar 3590 tape drives. Tape cartridges 370 may be any suitable tape cartridge device known in the art, (Magstar is a registered trademark of IBM Corporation) such as ECCST, Magstar, IBM 3420, 3480, 3490E, 3590 tape cartridges, etc. The tape subsystem 320 may be a manual tape library in which the user must manually mount tape cartridges 370 into the tape drives 330/340, or an automated tape library (ATL) in which a robotic arm mounts tape cartridges 370 in the library into the tape drives 330/340.

Figure 1:
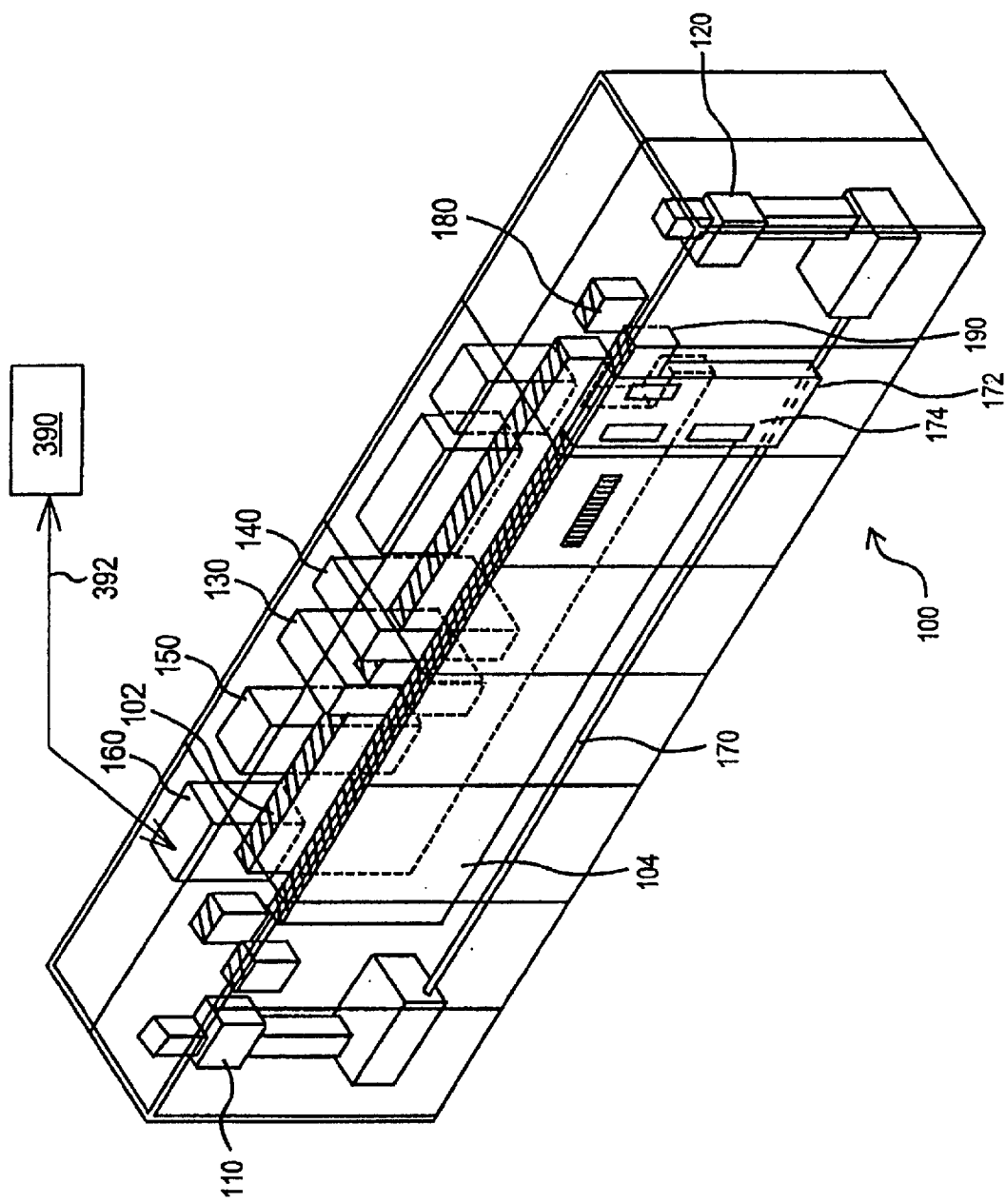
FIG. 1 is a perspective view of a first embodiment of Applicants' data storage and retrieval system.

For example referring now to FIG. 1, automated data storage and retrieval system 100 is shown having a first wall of storage slots 102 and a second wall of storage slots 104. Portable data storage cartridges, such as tape cartridges 370, are individually stored in these storage slots.

Data storage and retrieval system 100 includes one or more accessors, such as accessors 110 and 120. An accessor is a robotic device which accesses portable data storage media from first storage wall 102 or second storage wall 104, delivers that accessed media to data storage devices 130/140 for reading and/or writing data thereon, and returns the media to the proper storage slot.

Figure 2A:
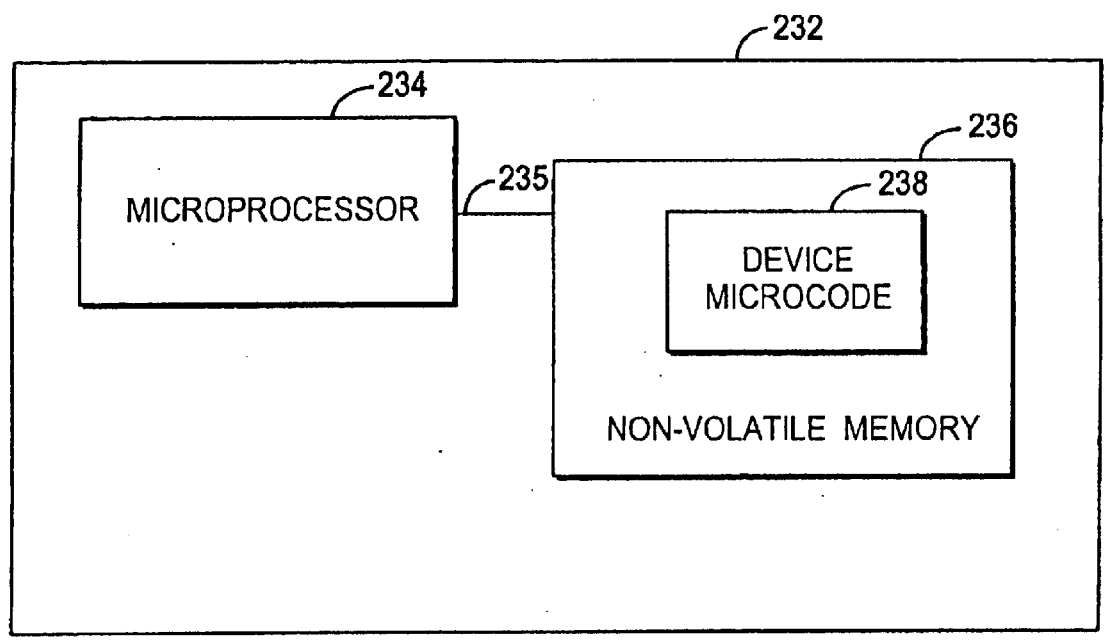
FIG. 2A is a block diagram of a controller disposed in Applicants' data storage device.
Figure 4:
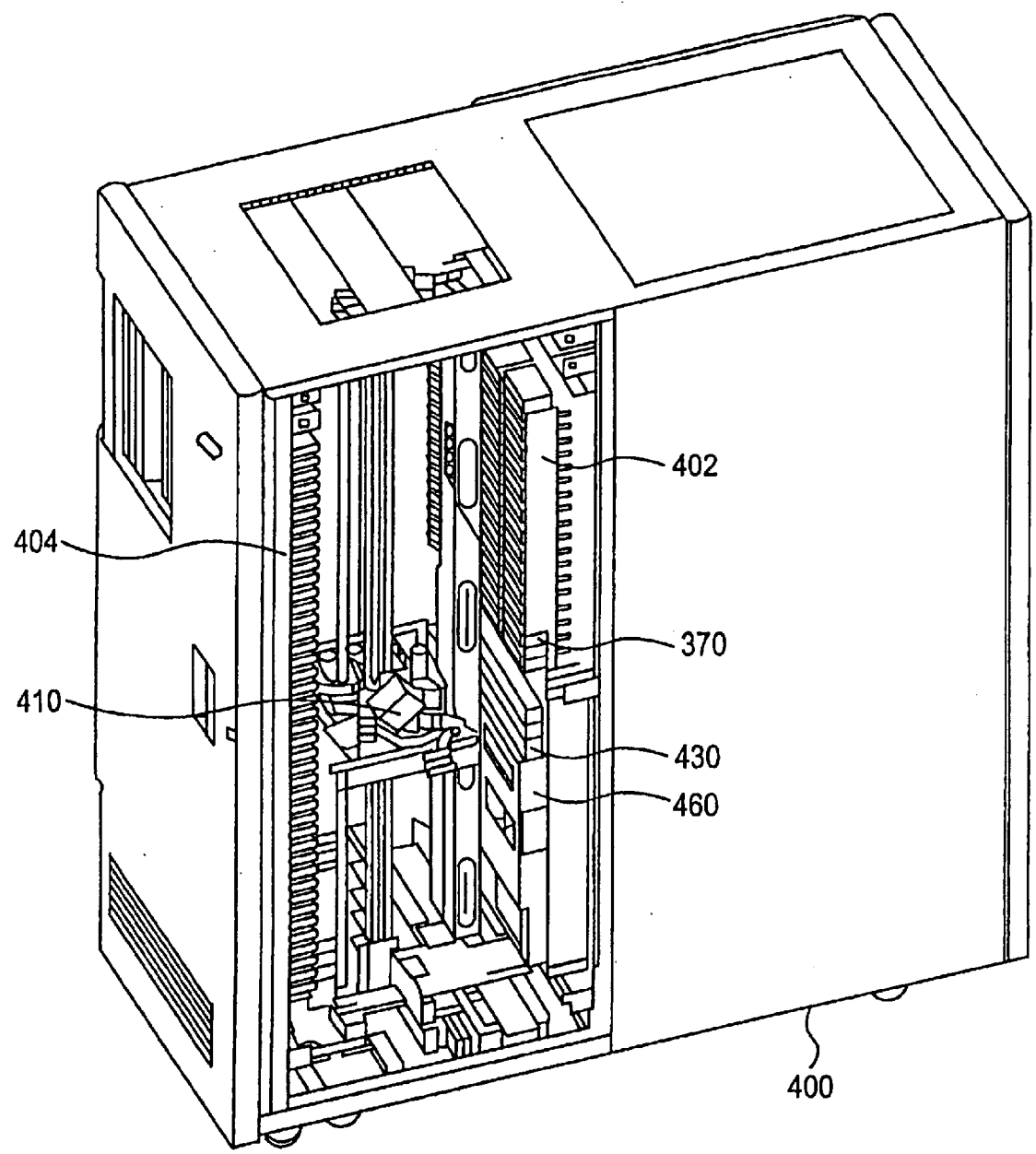
FIG. 4 is a perspective view of a second embodiment of Applicants' data storage and retrieval system.

Referring now to FIG. 2A, data storage device 130 includes device controller 232. Controller 232 includes microprocessor 234 in communication with memory 236. In certain embodiments, microprocessor 234 communicates with memory 236 via communication link 235. In other embodiments, memory 236 is integral to microprocessor 234. Device microcode 238 is stored in memory 236. Device microcode comprises a computer program product which controls the operation of a data storage device, such as data storage device 130 (FIG. 1)/140 (FIG. 1)/430 (FIG. 4).

Referring again to FIG. 1, in certain embodiments, library controller 160 is integral with host 390. In other embodiments, controller 160 is external to host 390. In those external embodiments, library controller 160 (FIG. 1) communicates with host computer 390 (FIGS. 1, 3) via communication link 392.

Figure 2B:
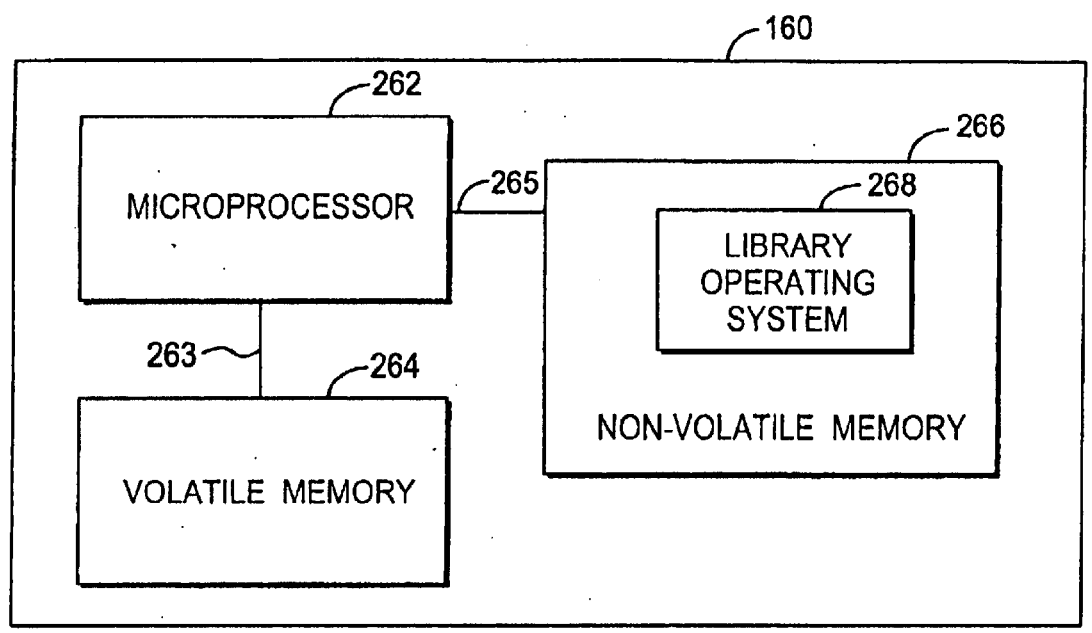
FIG. 2B is a block diagram of a controller disposed in Applicants' data storage and retrieval system.

Referring now to FIG. 2B, library controller 160 includes microprocessor 262, volatile memory 264, and non-volatile memory 266. In certain embodiments, microprocessor communicates with volatile memory 264 via communication link 263. In other embodiments, volatile memory 264 is integral to microprocessor 262. Microprocessor 262 communicates with non-volatile memory 266 via communication link 265. Library operating system 268 is stored in non-volatile memory 266. Operating system 268 comprises a computer program product which controls the operation of data storage and retrieval systems 100 (FIG. 1)/400 (FIG. 4), and tape subsystem 320 (FIG. 3).

Referring again to FIG. 1, operator input station 150 permits a user to communicate with Applicant's automated data storage and retrieval system 100. Devices 180 and 190 each comprise information buffers. In certain embodiments, devices 180 and/or 190 comprise a Direct Access Storage Device ("DASD") cache. In certain embodiments DASD cache 180 and 190 comprise a plurality of hard disk drives which are configured into one or more RAID arrays. In certain embodiments, information transferred between host computer 390 and data storage and retrieval system 100 is buffered in DASD caches 180 and 190 before being recorded on other data storage media, such as one or more magnetic tapes. Import/export station 172 includes access door 174 pivotably attached to the side of system 100. Portable data storage cartridges can be placed in the system, or in the alternative, removed from the system, via station 172/access door 174.

FIG. 4 shows system 400 which comprises another embodiment of Applicant's data storage and retrieval system. System 400 includes first storage wall 402 and second storage wall 404. Storage walls 402 and 404 each include a plurality of storage elements in which can be stored a plurality of portable data storage cartridges. System 400 includes one or more data storage devices, such as device 430. Device 430 comprises a floppy disk drive, an optical disk drive, a magnetic tape drive, and the like. System 400 further includes operator control panel 450 (not shown in FIG. 3).

System 400 further includes library controller 460. Library controller 460 controls the operation of assessor 410 and data storage device 430. Controller 460 is configured similarly to controller 160 shown in FIG. 2B. System 400 further includes one or a plurality of portable data storage cartridges, such as tape cartridges 370. Each cartridge contains a data storage media internally disposed therein, such as data storage media 360 (FIG. 3).

Referring again to FIG. 3, tape subsystem 320, such as data storage and retrieval system 100/200, receives commands from the HSM program 310 in the host system 390 and performs the operations requested by the HSM program 310, such as migration and recall, to transfer data between the host system 390 and the components managed by the tape subsystem 320. In preferred embodiments, the tape subsystem 320 can simultaneously process numerous input/output requests from the host system 390 and any other attached system directed toward the tape drives 330/340 and tape cartridges 370 managed by the tape subsystem 320. Moreover, in certain embodiments HSM program 310 in the host system 390 is capable of multi-tasking, simultaneously executing numerous input/output operations, and simultaneously transmitting multiple I/O requests to the tape subsystem 320 to execute.

In further embodiments, a plurality of host systems 390 may communicate with the tape subsystem 320 and/or a host system 390 may communicate and transfer data to a plurality of tape subsystems 320, each subsystem providing access to a library of tape cartridges.

Figure 5:
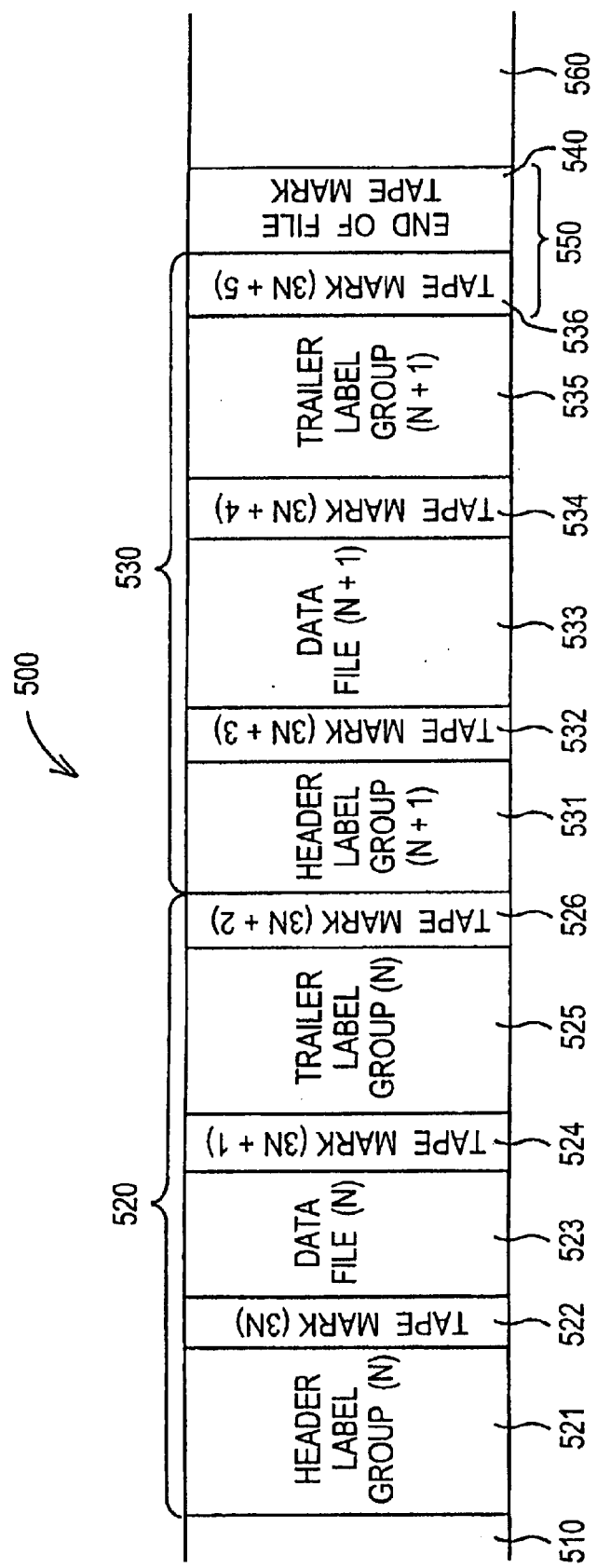
FIG. 5 is a block diagram showing the disposition of information disposed on a data storage tape medium.

FIG. 5 shows a block diagram depicting an industry-standard image of information stored on a data storage medium, such as a portion of magnetic tape 500. The information written on tape 500 includes file 520 and file 530. File 520 is the (N)th file stored on tape 500 and file 530 is the (N+1)th file stored on tape 500. Files 1 through (N−1) are stored on portion 510 of tape 500.

File 520 includes header label group 521, data 523, and trailer label group 525. Tape mark 522 is disposed between header label group 521 and data 523. Tape mark 524 is disposed between data 523 and trailer label group 525. Tape mark 526 is disposed after trailer label group 525. Thus, file 520 includes three (3) tape marks, i.e. tape marks 522, 524, and 526.

File 530 includes header label group 531, data 533, and trailer label group 535. Tape mark 532 is disposed between header label group 531 and data 533. Tape mark 534 is disposed between data 533 and trailer label group 535. Tape mark 536 is disposed after trailer label group 535. Thus, file 530 includes three (3) tape marks, i.e. tape marks 532, 534, and 536.

Tape mark 540 is disposed after tape mark 536. Tape mark 536 in combination with tape mark 540 comprises double tape mark 550. Double tape mark 550 signifies that file 530 is the last file written on tape 500. Thus, portion 560 of tape 500 contains no information.

Figure 6A:
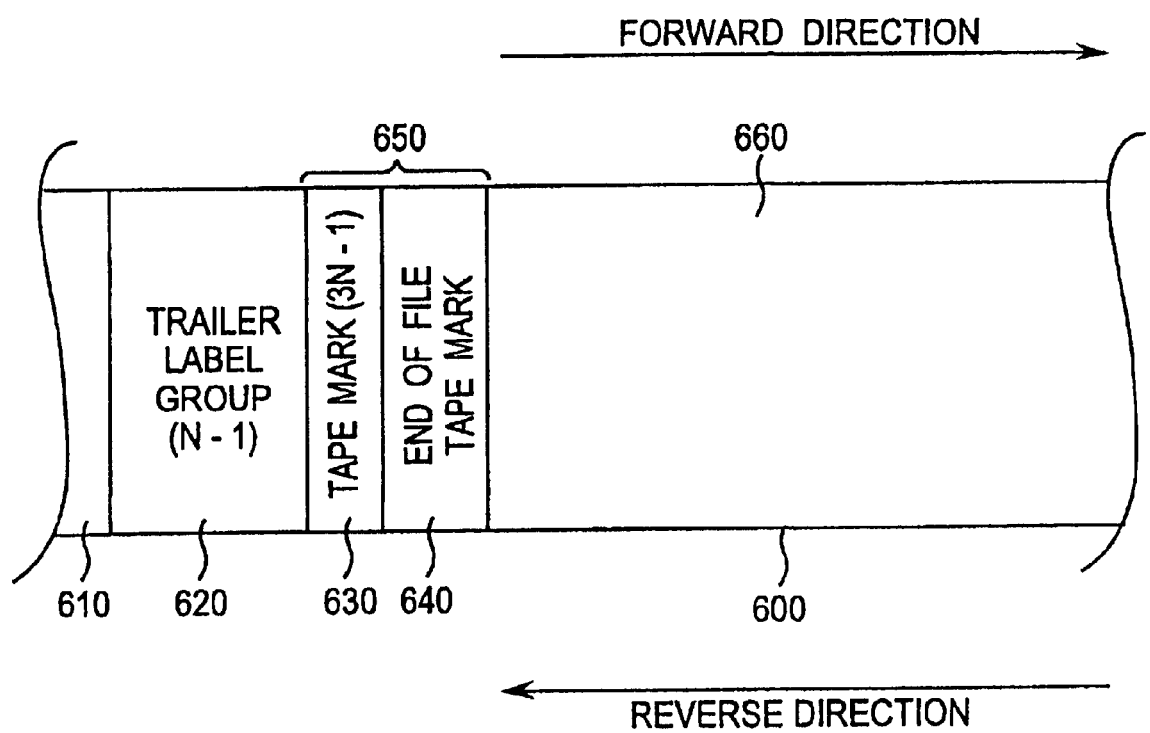
FIG. 6A is a block diagram showing certain steps of a prior art method to write information to a data storage tape medium.
Figure 6B:
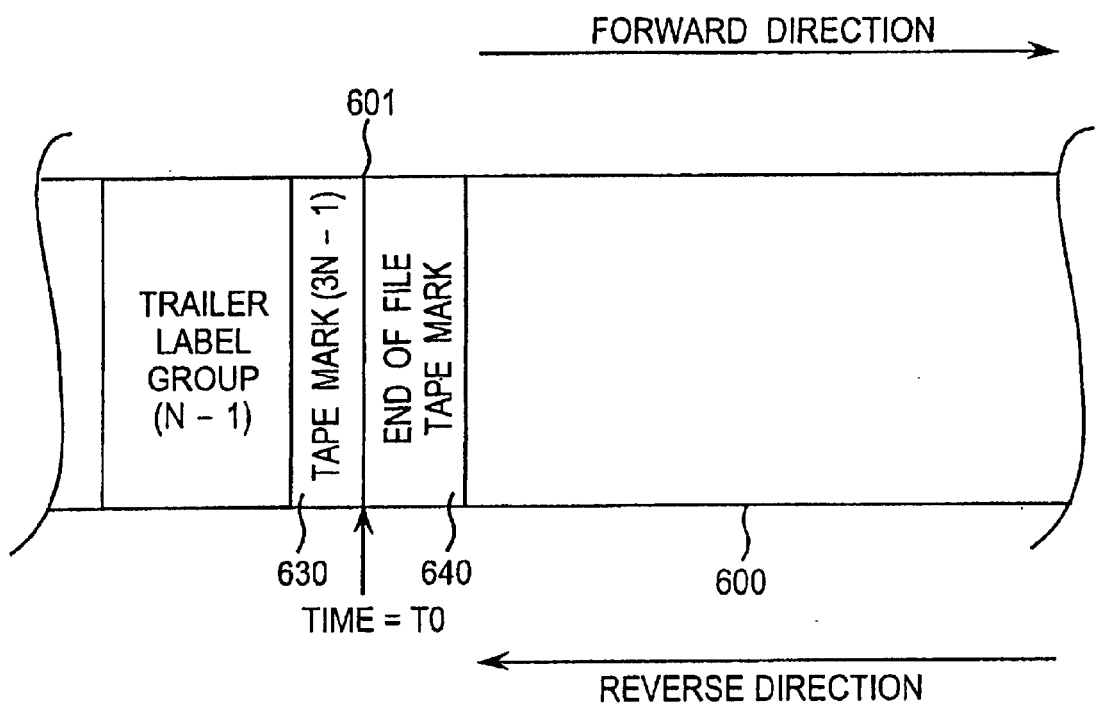
FIG. 6B is a block diagram showing certain steps of a prior art method to write information to a data storage tape medium.

FIGS. 6A–6E, 8, and 9, illustrate prior art methods to write information to tape 600. Referring to FIG. 6A, tape 600 includes (N−1) files. The (N−1)th file ends with trailer label group 620 followed by tape mark 630 and end of file tape mark 640. Tape mark 630 in combination with tape mark 640 comprises double tape mark 650. As noted above, double tape mark 650 identifies the end of information stored on tape 600. Thus, no files are stored on portion 660 of tape 600.

In step 810 (FIG. 8), an attached host computer, such as host computer 390 (FIG. 3), instructs a data storage device, such as data storage device 130 (FIG. 1), to write new information on a designated data storage medium, such as tape 600. In step 820 a robotic accessor, such as accessor 110 (FIG. 1), retrieves and transports the portable data storage cartridge housing tape 600. In step 830, that portable data storage cartridge is inserted, i.e. mounted, in data storage device 130.

In step 840, data storage device 130 advances tape 600 in either the forward or the reverse direction as needed until double tape mark 650 is found. As those skilled in the art will appreciate, data storage device 130 includes read/write head 132 (not shown in FIGs.) internally disposed therein. Upon locating double tape mark 650, the movement of tape 600 is stopped. In step 850, a Back Space File command ("BSF") command is issued to tape drive 130 and tape 600 is moved to position read/write head 132 between tape mark 630 and tape mark 640, i.e. to about position 601 which is shown on FIG. 6B. Read/write head 132 is positioned at about point 601 on tape 600 at time $T_0$.

Figure 6C:
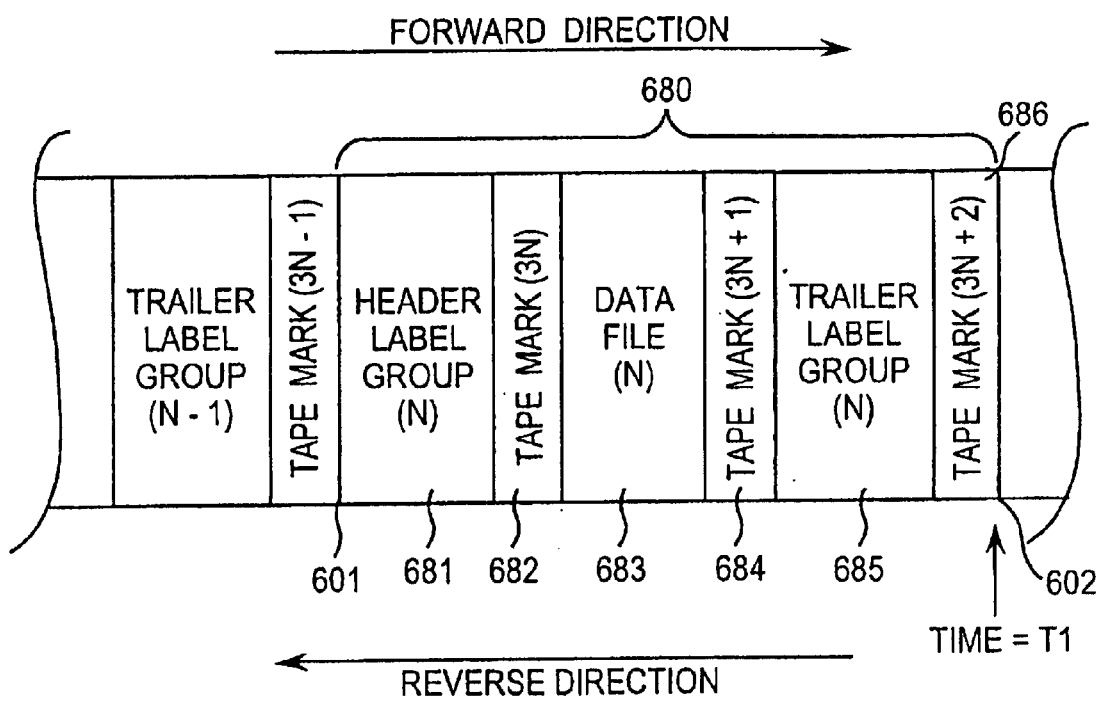
FIG. 6C is a block diagram showing certain steps of a prior art method to write information to a data storage tape medium.
Figure 9:
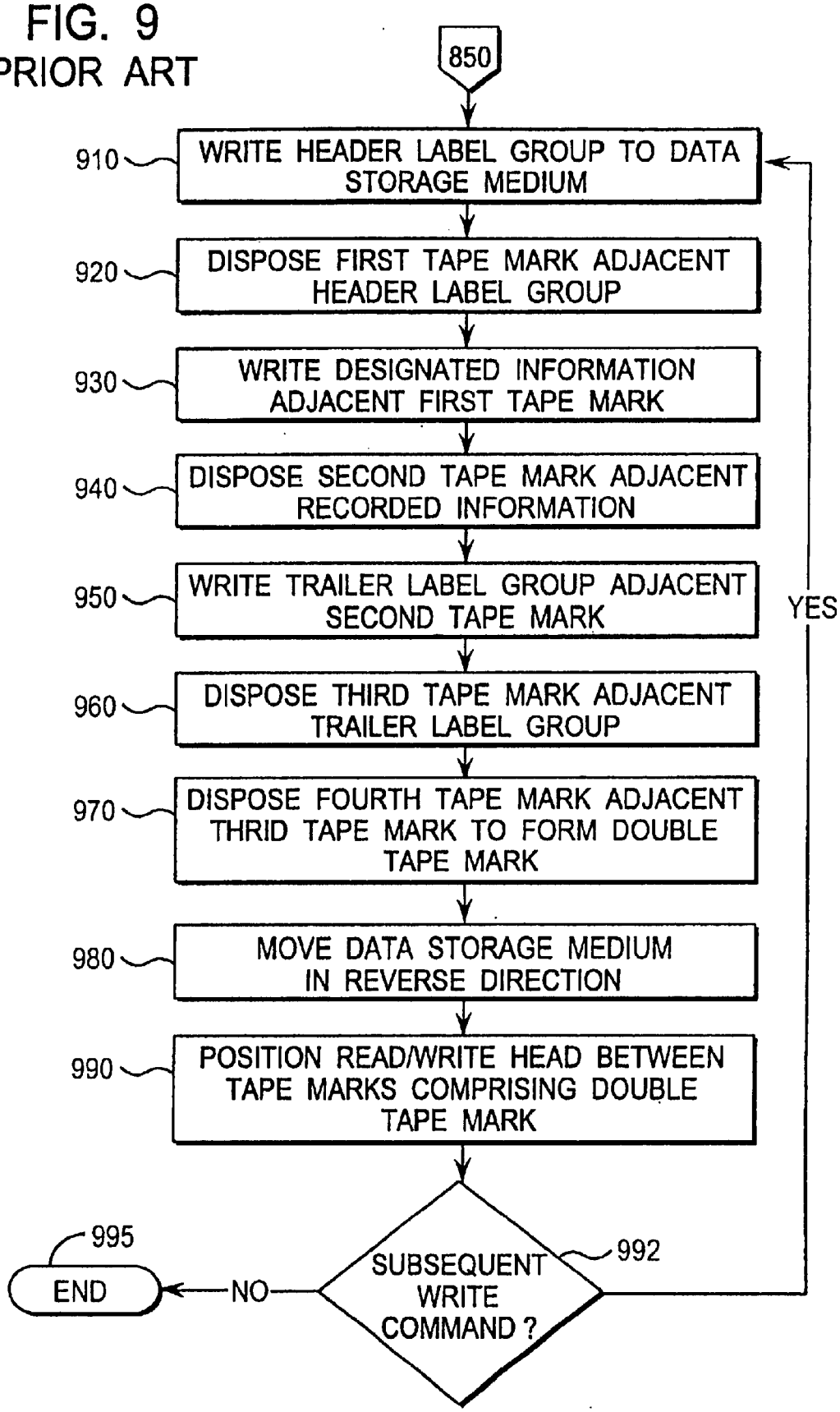
FIG. 9 is a flowchart summarizing the steps of prior art methods to write information to a data storage tape medium.

FIG. 9 summarizes the prior art method to write file 680 to tape 600 starting at about point 601. Referring now to FIGS. 6C and 9, in step 910 header label group 681 is written to tape 600 starting at about position 601. After header label group 681 is written to tape 600, in step 920 tape mark 682 is written to tape 600 adjacent header label group 681. After writing tape mark 682 to tape 600, in step 930 data 683 is written to tape 600 adjacent tape mark 682. In step 940 tape mark 684 is written to tape 600 adjacent data 683. In step 950 trailer label group 685 is written to tape 600 adjacent tape mark 684. In step 960 tape mark 686 is written to tape 600 adjacent trailer label group 685.

After writing header label group 681, tape mark 682, data 683, tape mark 684, trailer label group 685 and tape mark 686, at time $T_1$ read/write head 132 is positioned at about point 602 of tape 600. Those skilled in the art will appreciate that the time period between $T_0$ and $T_1$, $\Delta T_{Information\ Write}$, represents the time required to write file 680 to tape 600.

Figure 6D:
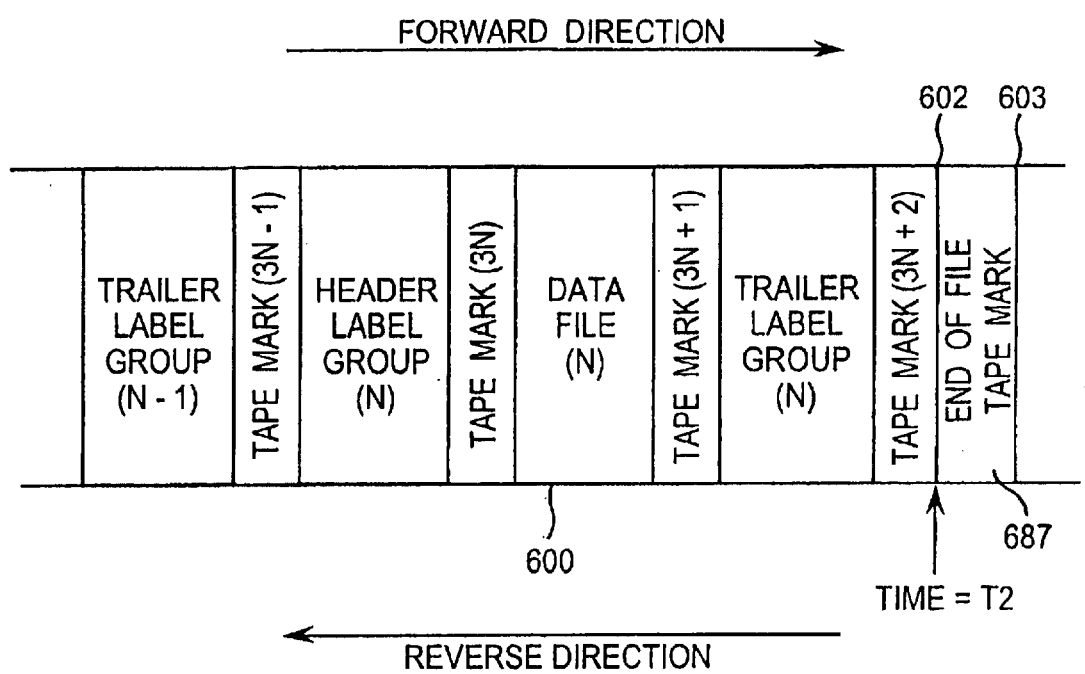
FIG. 6D is a block diagram showing certain steps of a prior art method to write information to a data storage tape medium.

Referring now to FIG. 6D, in step 970 tape mark 687 is written to tape 600 adjacent tape mark 686 to form double tape mark 690. After writing tape mark 687, read/write head 132 is disposed adjacent point 603 on tape 600. In step 980 a Back Space File command is issued which causes tape 600 to move in the reverse direction such that read/write head 132 is positioned between tape marks 686 and 687. In step 990 tape 600 is moved such that read/write head 132 is again disposed adjacent point 602 at time $T_2$. Those skilled in the art will appreciate that the time interval between time $T_1$ and time $T_2$, i.e. $\Delta T_{Head\ Reposition}$, represents the time required to write tape mark 687 and to reposition tape 600 such that read/write head 132 is disposed adjacent point 602.

Figure 6E:
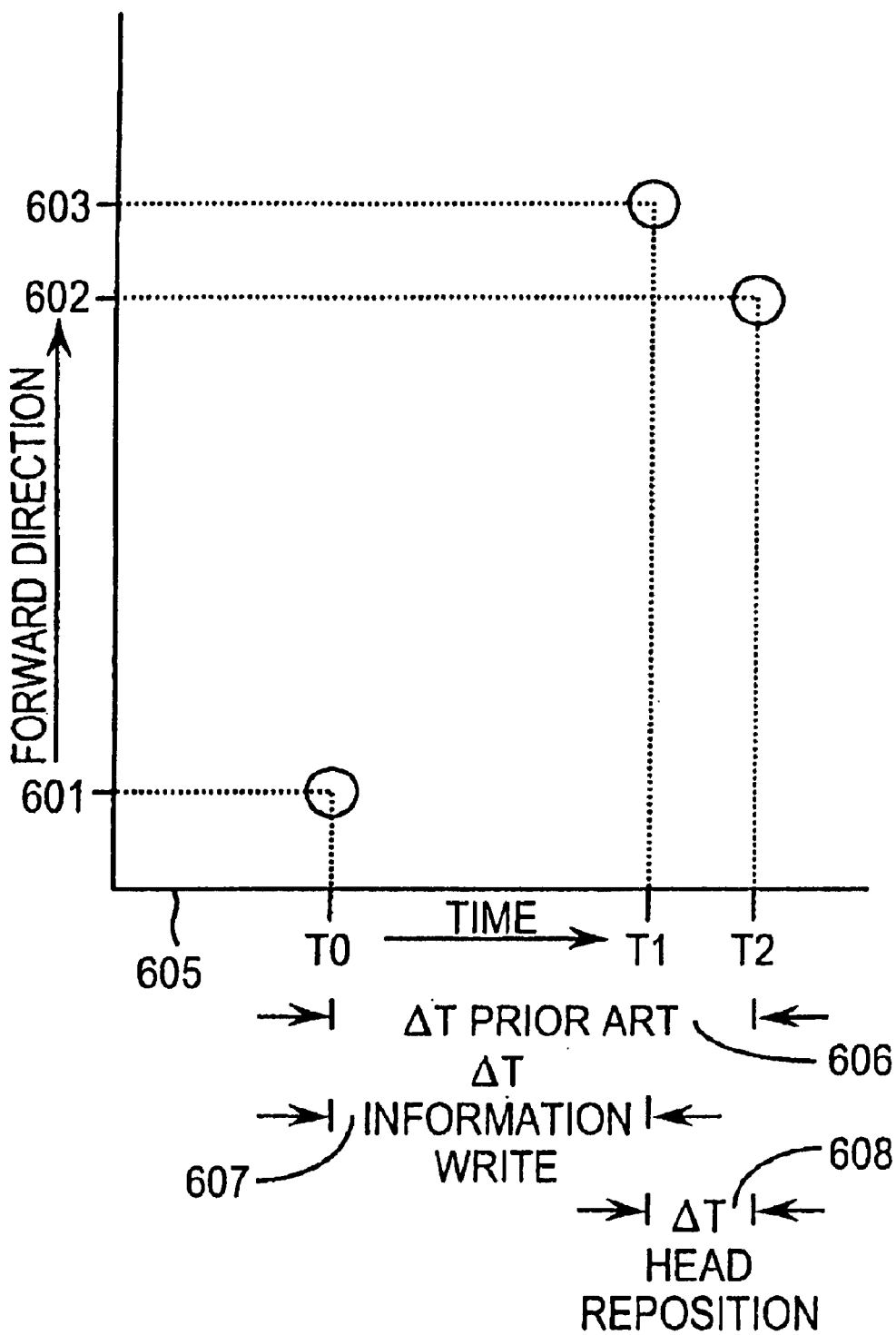
FIG. 6E graphically depicts the time required to write information to a data storage tape medium using prior art methods.

Referring now to FIG. 6E, graph 605 summarizes temporal and positional information regarding the prior art process discussed above. The time interval $\Delta T_{Prior\ Art}$ between the commencement of writing information 680 to tape 600 and the commencement of writing a subsequent file to tape 600, i.e. time interval 606, comprises both $\Delta T_{Information\ Write}$, i.e. time interval 607, and $\Delta T_{Head\ Reposition}$, i.e. time interval 608. Those skilled in the art will appreciate that writing (N) files to tape 600 using prior art methods necessarily requires Total Time$_{Prior\ Art}$ which equals:

$$Total\ Time_{Prior\ Art} = \sum_{i=1}^{N} \Delta Ti_{Prior\ Art}$$

where $\Delta Ti_{Prior\ Art}$ is the time to write the (i)th file to the tape. As discussed above, the time to write the (i)th file using prior art methods includes $\Delta T_{Information\ Write}$ and $\Delta T_{Head\ Reposition}$. Therefore, Total Time$_{Prior\ Art}$ necessarily equals:

$$Total\ Time_{Prior\ Art} = \sum_{i=1}^{N} \Delta Ti_{Information\ Write} + \sum_{i=1}^{N} \Delta Ti_{Head\ Reposition}$$

Needless to say, as (N) increases, the aggregate time required to write (N) double tape marks, issue (N) Back Space File commands, and to move the tape backwards (N) times, also increases.

In marked contrast, however, when writing (N) files to a data storage medium, such as a magnetic tape, Applicants' method eliminates the need to reverse the movement of the tape (N) times and eliminates the need to write a double tape mark (N) times. Thus, the total time to write (N) files to a tape storage medium using Applicants' method is:

$$Total\ Time_{Applicants} = \sum_{i=1}^{N} \Delta Ti_{Information\ Write}$$

Figure 7A:
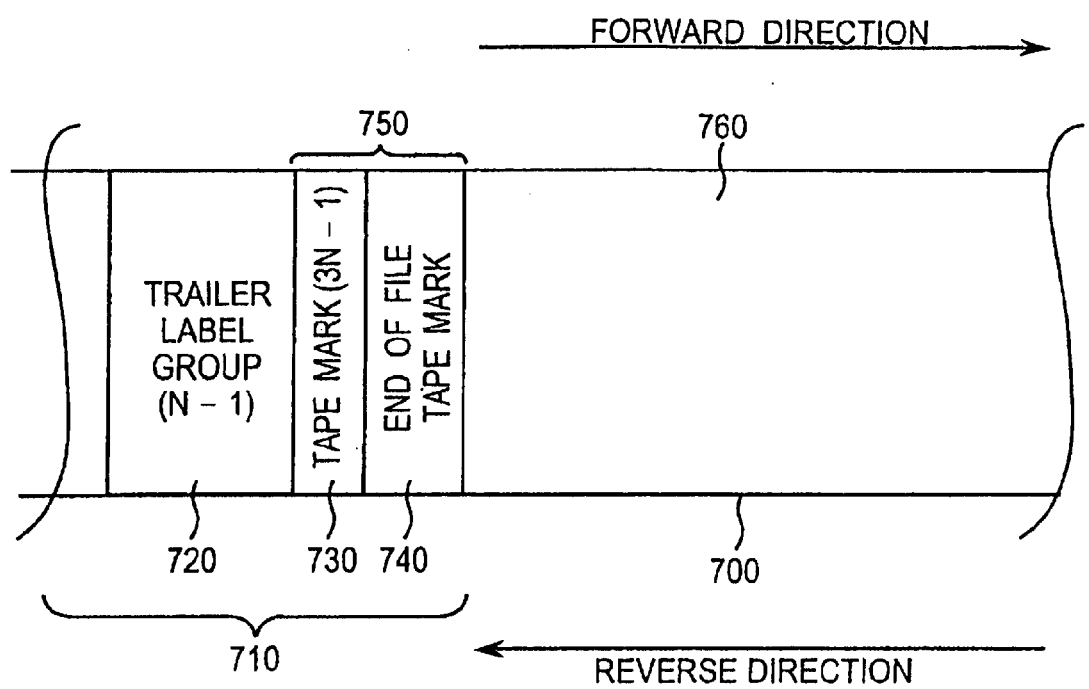
FIG. 7A is a block diagram showing certain steps of Applicants' method to write information to a data storage tape medium.

FIGS. 7A–7F, 8, 10, and 11 summarize Applicants' method to write information to tape 700. Referring now to FIG. 7A, tape 700 includes (N-1) files written on portion 710. No information has been written to portion 760 of tape 700. The last file written to tape 700 ends with trailer label group (N-1), tape mark (3N-1), and end of file tape mark 740.

Figure 7B:
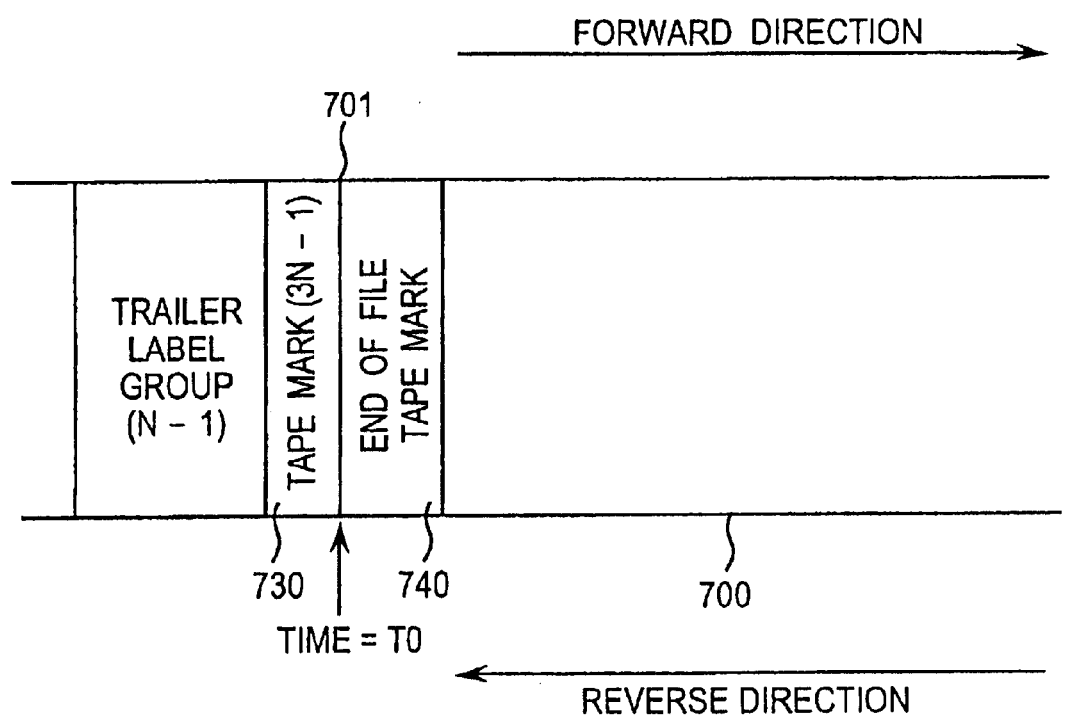
FIG. 7B is a block diagram showing certain steps of Applicants' method to write information to a data storage tape medium.
Figure 7C:
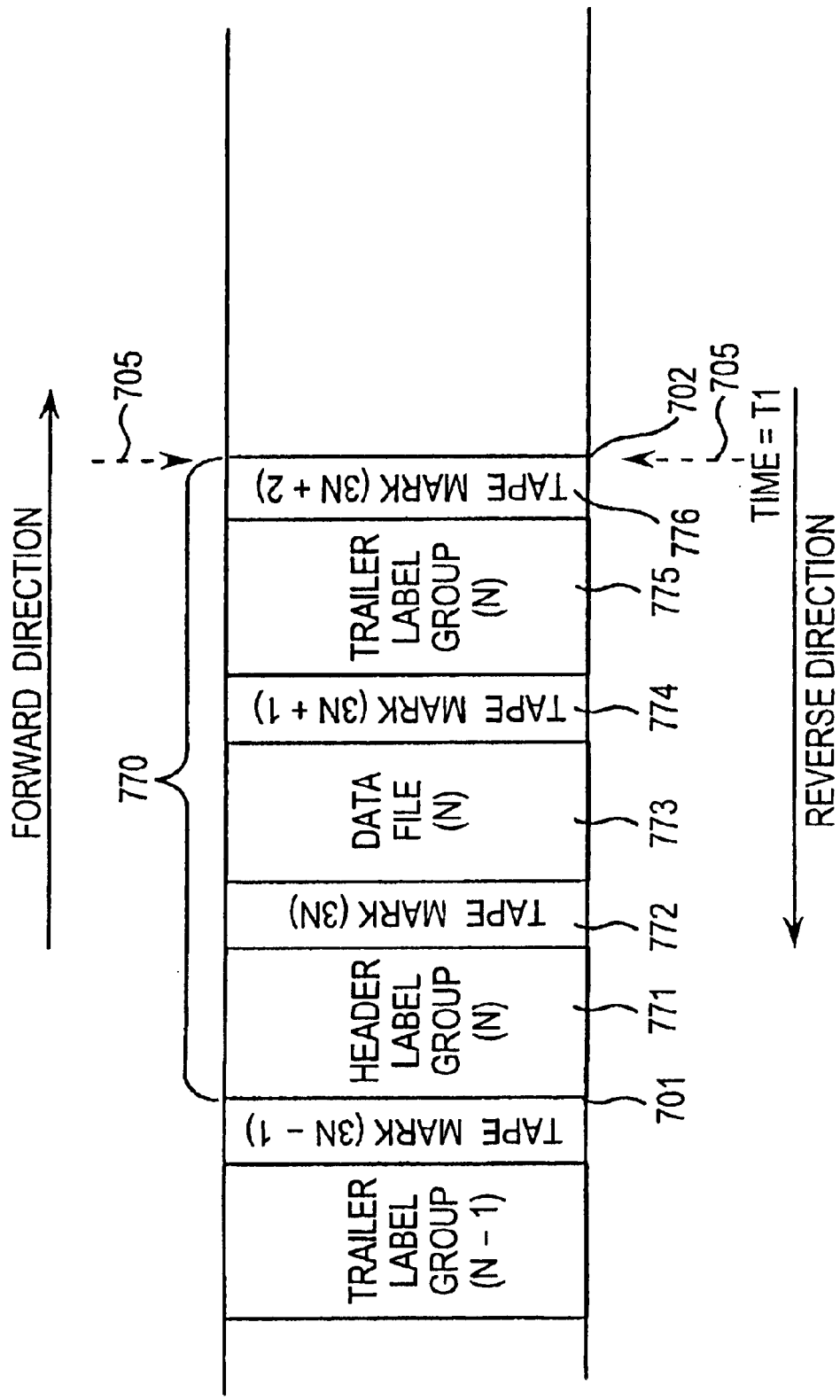
FIG. 7C is a block diagram showing certain steps of Applicants' method to write information to a data storage tape medium.
Figure 10:
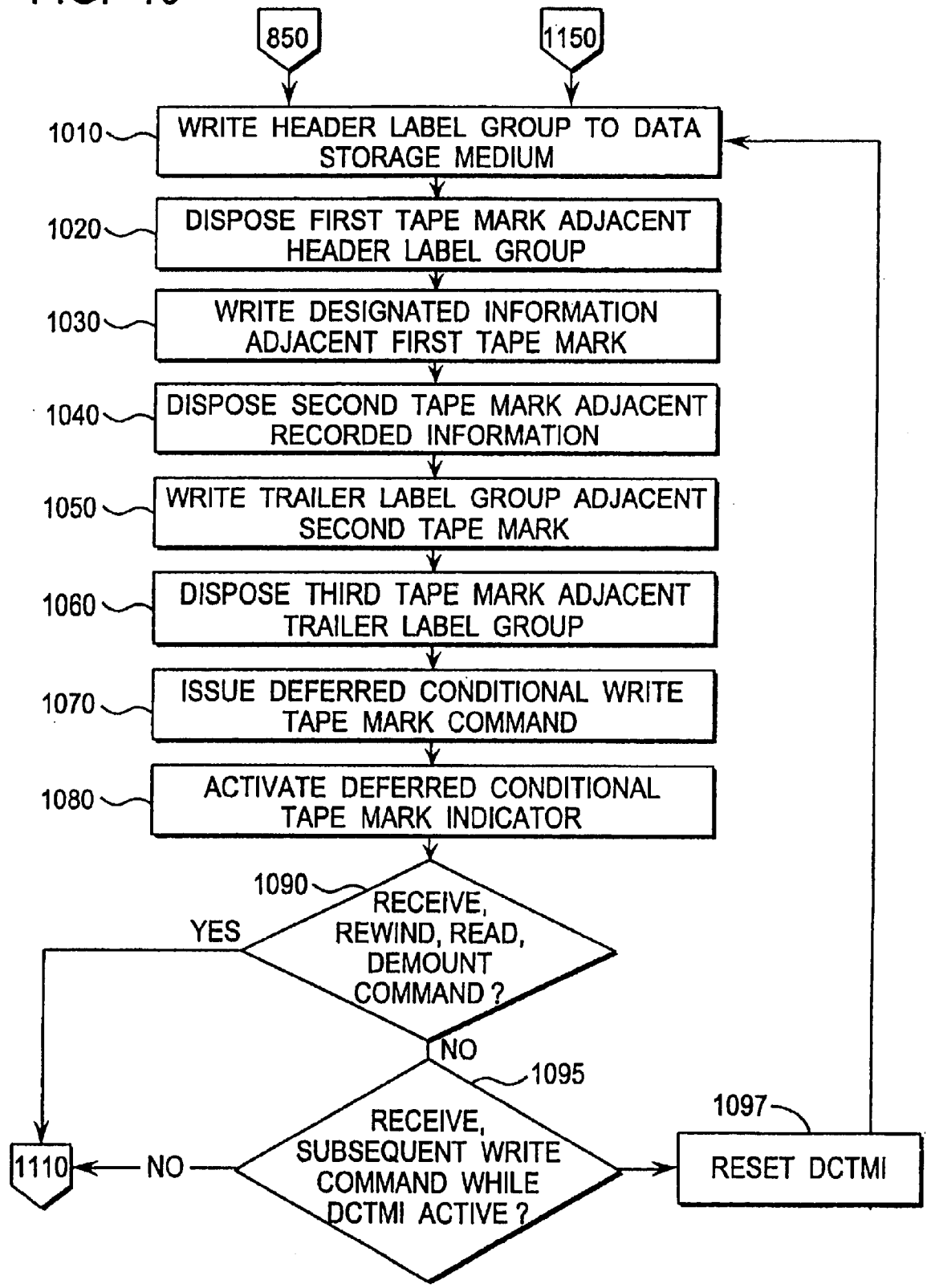
FIG. 10 is a flowchart summarizing additional steps in Applicants' method to write information to a data storage tape medium.
Figure 11:
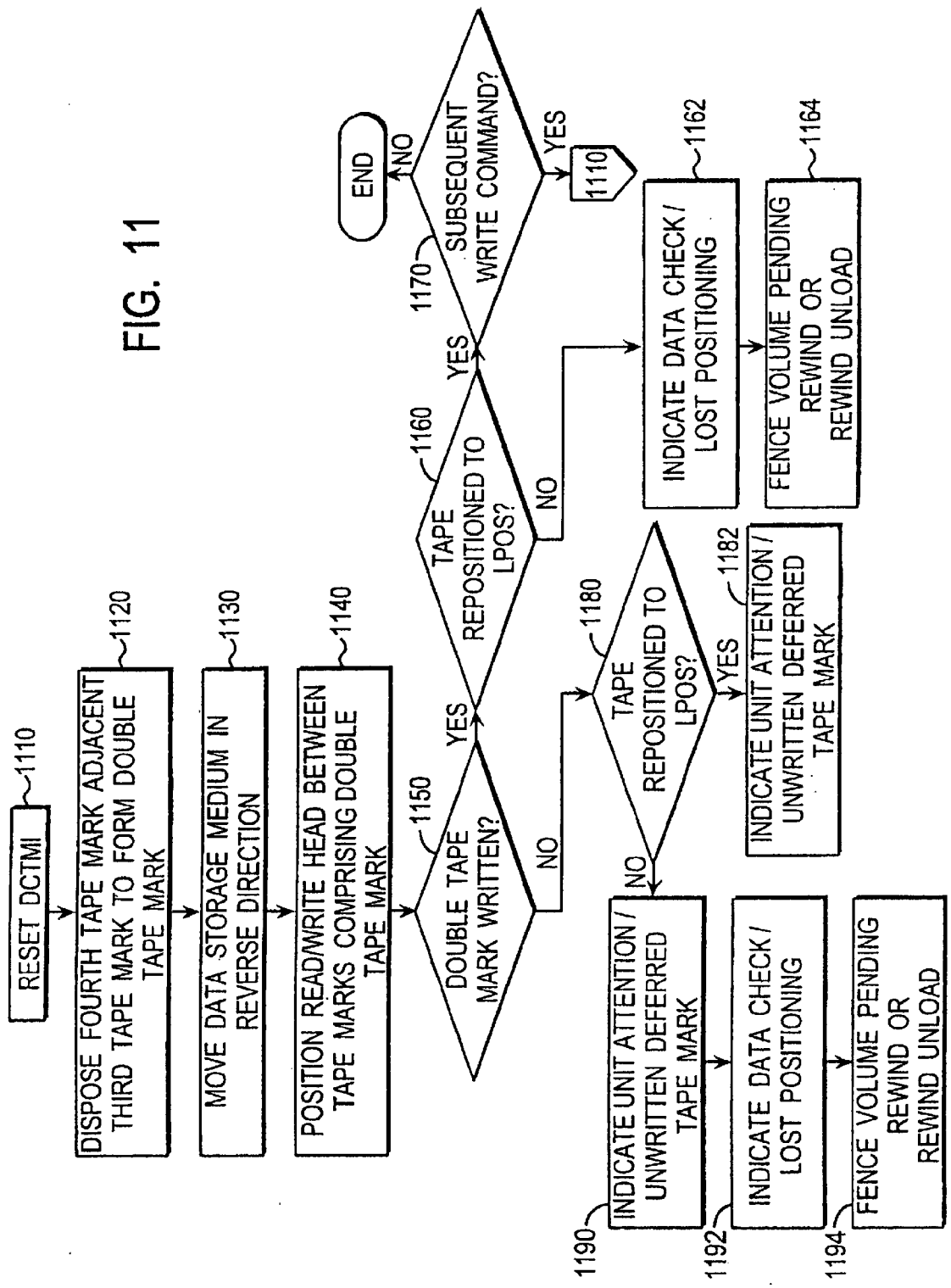
FIG. 11 is a flowchart summarizing additional steps in Applicants' method to write information to a data storage tape medium.

Referring now to FIG. 7B, when tape 700 is mounted in a data storage device, such as device 130 (FIG. 1), and device 130 receives a WRITE command from an on-line host computer, such as host computer 390, Applicants' method follows steps 810 (FIG. 8), 820 (FIG. 8), 830 (FIG. 8), 840 (FIG. 8), and 850 (FIG. 8) to position read/write head 132 at about position 701. Thereafter beginning at time $T_0$, file 770 is written to tape 700 starting at position 701. File 770 includes header label group (N), tape mark (3N), data (N), tape mark (3N+1), trailer label group (N), and tape mark (3N+2). Referring now to FIG. 10, in steps 1010 through 1060 header label group (N), tape mark (3N), data (N), tape mark (3N+1), trailer label group (N), and tape mark (3N+2) are successively written to tape 700 to produce the image shown in FIG. 7C.

After writing file 770 to tape 700, read/write head 132 is positioned at point 702 on tape 700 at time $T_1$. Rather than issuing a set of commands comprising a Write Tape Mark ("WTM") command followed by a Back Space File ("BSF") command, i.e. writing an End Of File tape mark after tape mark 776, moving tape 700 in the reverse direction, and positioning read/write head 132 between tape mark 776 and the End Of File tape mark, in step 1070 host 390 instead issues a DEFERRED CONDITIONAL WRITE TAPE MARK command ("DCWTM" command). Upon receipt of such a DCWTM command, in step 1080 data storage device 130 activates an internal indicator, i.e. DEFERRED CONDITIONAL TAPE MARK INDICATOR ("DCTMI") 705, but causes no immediate movement of tape 700.

A DCTMI, such as DCTMI 705, remains set for only a defined time interval, i.e. the deferred conditional tape mark indicator time interval. In certain embodiments, the deferred conditional tape mark indicator time interval is encoded in software/firmware, and therefore, cannot be modified by the user. In these embodiments, the deferred conditional tape mark indicator time interval is specified by tape library manufacturer. In certain embodiments of Applicants' invention a DCTMI remains set for about ten seconds, i.e. the deferred conditional tape mark indicator time interval has a specified duration of about ten seconds. In other embodiments, the deferred conditional tape mark indicator time interval has a specified duration less than about ten seconds. In still other embodiments, the deferred conditional tape mark indicator time interval has a specified duration greater than about ten seconds.

While DCTMI 705 remains set, tape drive 130 keeps read/write head 132 positioned adjacent point 702 on tape 700. As a general matter, the DCWTM command is quickly followed by a WRITE command associated with the recording of a new file. However, in the event data storage device 130 receives any command which causes motion or synchronization of tape 700, such as a REWIND command, a READ command, or a DEMOUNT command, i.e. a command that does not explicitly cause writing, erasure, or formatting of media 700, then in step 1090 Applicants' method transitions to step 1110. A command that implicitly causes writing, erasure, or formatting, of the media only to force synchronization also causes Applicants' method to transition to step 1110.

On the other hand, if data storage device 130 receives, for example, a subsequent WRITE command, a WRITE TAPE MARK command, a MARK LOGICAL BLOCK command, or a SCALE CAPACITY COMMAND, while DCTMI 705 remains set, then Applicants' method transitions to step 1097 wherein the DCTMI is reset. Thereafter, data storage device 130 executes the follow-on command. For example, if the command received in step 1095 is a WRITE command to record file 780 to tape 700, then in step 1097 Applicants' method resets DCTMI 705 and transitions to step 1010 to record file 780 to tape 700.

Figure 7D:
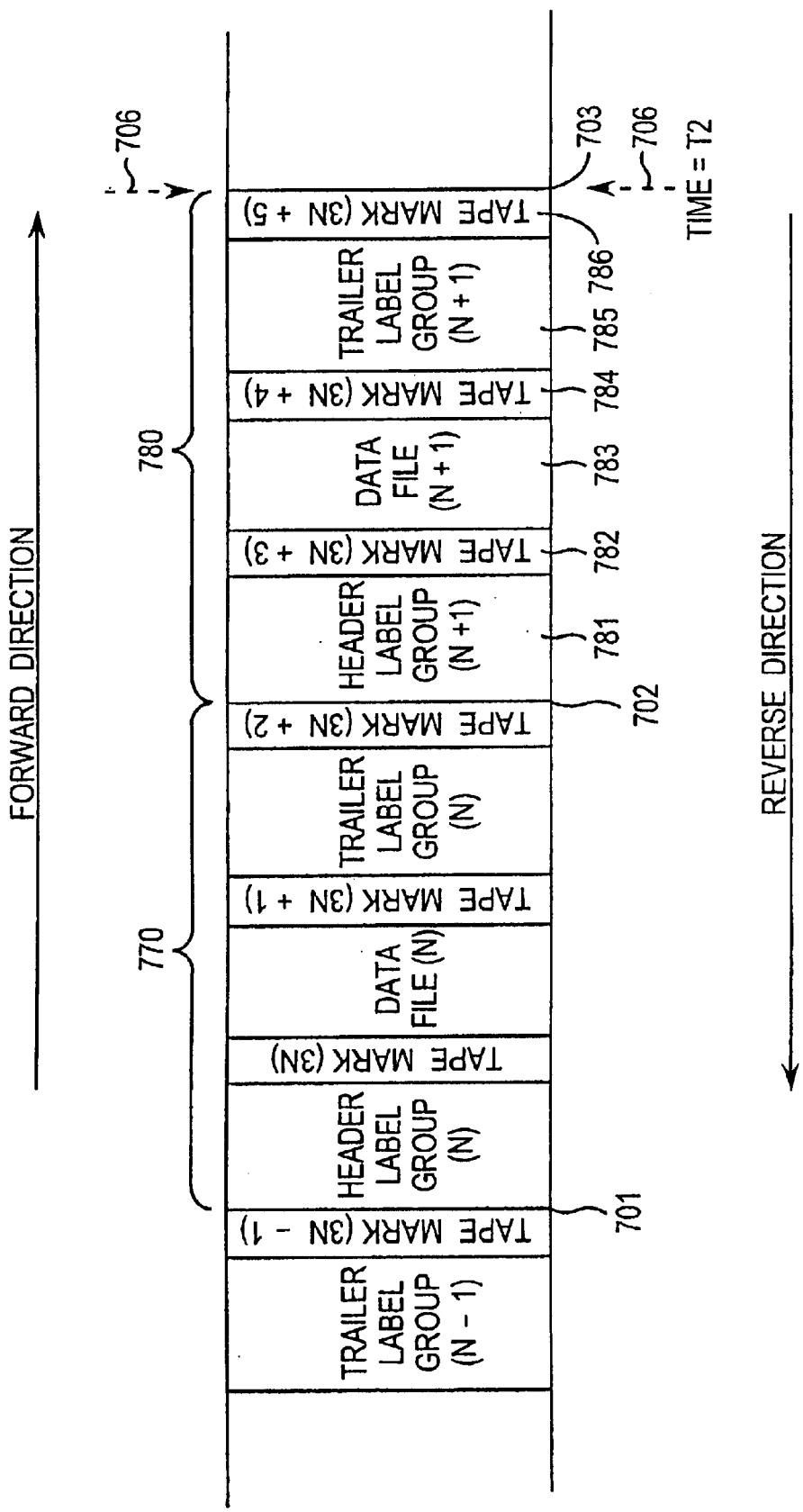
FIG. 7D is a block diagram showing certain steps of Applicants' method to write information to a data storage tape medium.
Figure 7E:
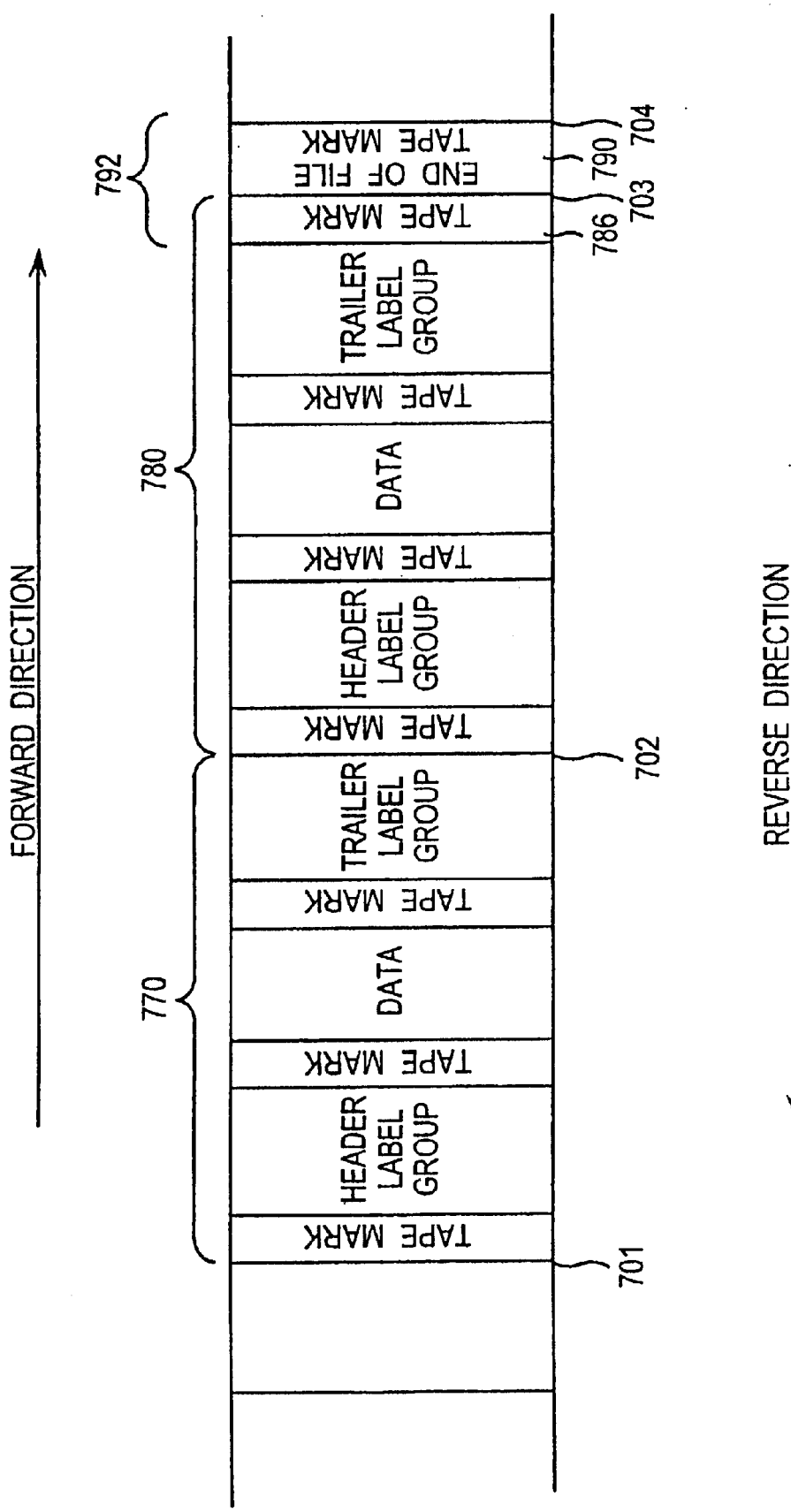
FIG. 7E is a block diagram showing certain steps of Applicants' method to write information to a data storage tape medium.
Figure 8:
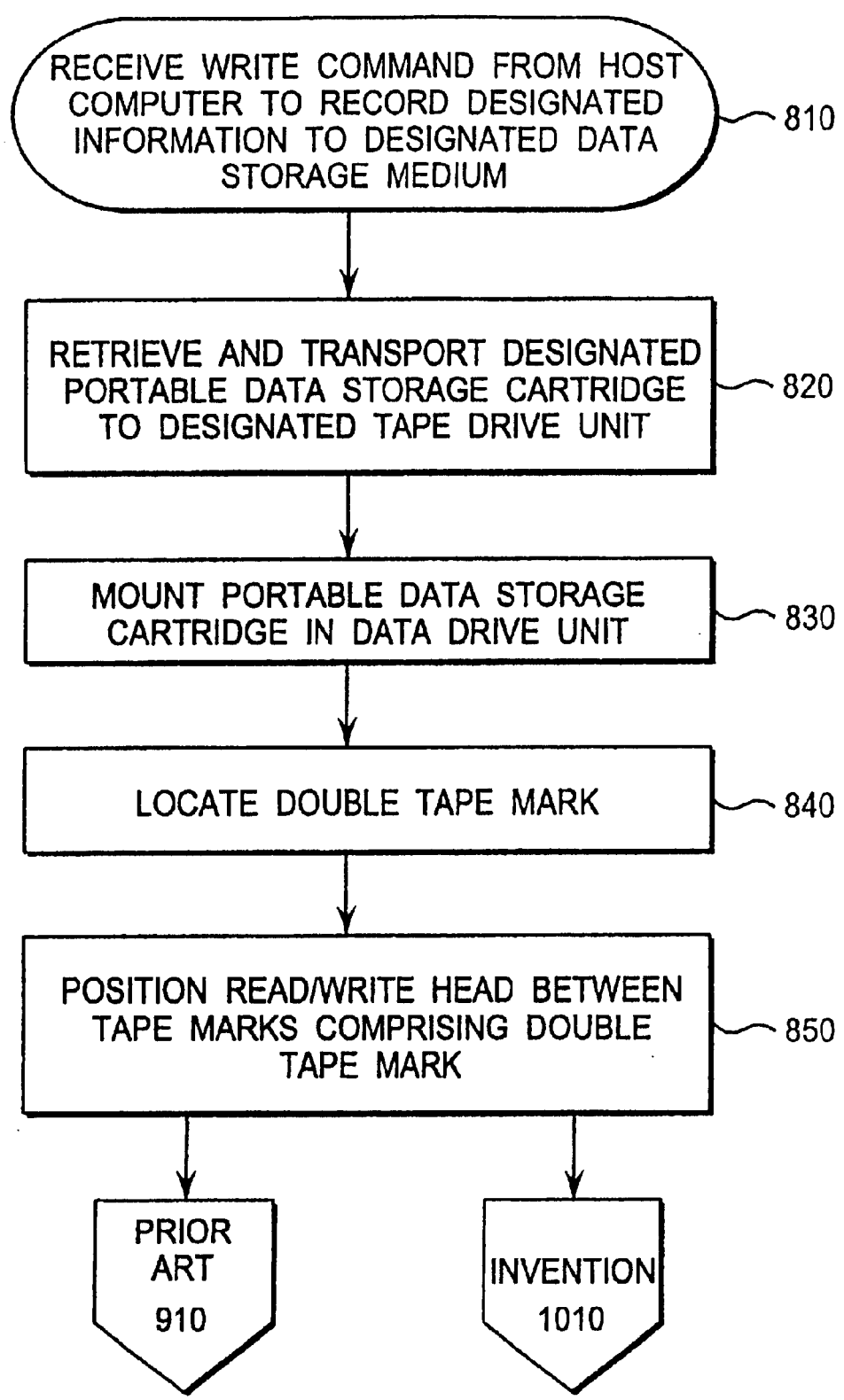
FIG. 8 is a flowchart summarizing the initial steps in Applicants' method to write information to a data storage tape medium.

Referring now to FIGS. 7D and 10, upon receipt of a WRITE command for file 780 in step 1095, data storage device 130 resets DCTMI 705 in step 1097 and writes file 780 to tape 700. File 780, as written to tape 700 using Applicants' method, includes header label group 781, tape mark 782, data 783, tape mark 784, trailer label group 785, and tape mark 786. After writing file 780 to tape 700, read/write head 132 is positioned at about point 703 on tape 700 at time $T_2$. As those skilled in the art will appreciate, point 703 on tape 700 comprises the current logical medium position ("LPOS"). Thereafter, in step 1070 host computer 390 issues a deferred conditional write tape mark command and in step 1080 data storage device 130 sets DCTMI 706.

In the event data storage device 130 thereafter receives any command explicitly causing writing, erasure, or formatting of media 700, but not implicitly causing such writing, erasure, or formatting only as a matter of forcing synchronization, then in step 1090 Applicants' method transitions to step 1110 wherein DCTMI 706 is reset. Thereafter data storage device 130 executes a set of WTM/BSF commands which in step 1120 writes tape mark 790 adjacent tape mark 786. Referring again to FIG. 7E, after writing tape mark 790 read/write head 132 is positioned at about point 704 on tape 700.

In step 1130 data storage device 130 then executes a BSF command which causes tape 700 to move in the reverse direction in order to position read/write head 132 in step 1140 at about point 703. Successfully writing double tape mark 792, i.e. successful performance of step 1120, guarantees that the image generated on tape 700 using Applicants' method will match the image produced using prior art methods, i.e. a double tape mark indicating the end of the information disposed on tape 700.

The image generated on tape 700 produced using Applicants' method is identical to that produced using prior art methods, however, the time overhead associated with repetitively: (i) writing a second tape mark, (ii) moving the tape in the reverse direction, and (iii) repositioning the read/write head between the double tape mark generated, is completely eliminated.

Applicants' method further includes certain diagnostic/ error-handling protocols. Referring again to FIG. 11, in step 1150 the data storage device, such as device 130 (FIG. 1) ascertains if tape mark 790 was successfully written to tape 700 to form double tape mark 792. If device 130 determines in step 1150 that double tape mark 792 was successfully written to tape 700, then in step 1160 device 130 ascertains if tape 700 has been successfully moved such that the read/write head is repositioned at the LPOS, i.e. position 703. In the event double tape mark 792 was successfully written to tape 700, and in the event read/write head 132 has been successfully repositioned to the LPOS, and in the event device 130 receives a WRITE command in step 1170 instructing device 130 to record additional information to tape 700, then Applicants' method transitions to step 1010 (FIG. 10).

In the event device 130 determines in step 1150 that double tape mark 792 was successfully written to tape 700, and in the event device 130 in step 1160 determines that tape 700 was not properly repositioned such that read/write head 132 is positioned at the LPOS, then in step 1162 device 132 provides a DATA CHECK/LOST POSITIONING error message. In step 1164 tape 700 is "fenced" meaning that device 130 will not execute any subsequent commands directed to tape 700 other than either a REWIND or a REWIND UNLOAD command.

In the event device 130 ascertains in step 1150 that tape mark 790 was not successfully written to tape 700, then in step 1180 device 130 determines if tape 700 has been successfully repositioned such that read/write head 132 is positioned at the LPOS. In the event tape mark 790 was not successfully written to tape 700 but tape 700 is nevertheless successfully repositioned such that read/write head 132 is positioned at the LPOS, then in step 1182 device 130 provides an Unwritten Deferred Tape Mark error message.

In the event device 130 determines in step 1150 that tape mark 790 was not successfully written to tape 700, and in the event device 130 determines in step 1180 that tape 700 was not successfully repositioned such that read/write head 132 is positioned at the LPOS, then in step 1190 device 130 provides an UNWRITTEN DEFERRED TAPE MARK error message and in step 1192 device 130 provides an DATA CHECK/LOST POSITIONING error message. Thereafter in step 1194, tape 700 is "fenced" meaning that device 130 will not execute any subsequent commands directed to tape 700 other than either a REWIND or a REWIND UNLOAD command.

Applicants' invention includes a data storage device comprising a computer useable medium having computer readable program code disposed therein for implementing Applicants' method for fast multiple file write operations. Applicants' invention further includes a data storage and retrieval system comprising one or more of Applicants' data storage devices. Applicants' invention further includes computer program products embodied as program code stored in one or more memory devices, such as a magnetic disk, a magnetic tape, or other non-volatile memory device, disposed in Applicants' data storage device.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage device comprising a computer useable medium having computer readable program code disposed therein for recording information on a data storage medium, the computer readable program code comprising a series of computer readable program steps to effect:

receiving a first command to record first information on said data storage medium;

receiving said first information, wherein said first information comprises a first header label group, first data, a first trailer label group;

moving said data storage medium in a first direction;

recording said first information beginning at a first time on said moving data storage medium;

receiving a first deferred conditional write tape mark command;

setting at a second time a first deferred conditional tape mark indicator;

writing said first header label group to said moving data storage medium;

writing a first tape mark adjacent said first header label group;

writing said first data adjacent said first tape mark;

writing a second tape mark adjacent said first data;

writing said first trailer label group adjacent said second tape mark;

writing a third tape mark adjacent said first trailer label group;

specifying a deferred conditional tape mark indicator time interval; and writing a third tape mark adjacent said first trailer label group:

specifying a deferred conditional tape mark indicator time interval; and maintaining said first deferred conditional tape mark indicator during said deferred conditional tape mark indicator time interval.

2. The data storage device of claim 1, wherein said deferred conditional tape mark indicator time interval is between about 5 seconds and about 20 seconds.

3. The data storage device of claim 2, wherein said deferred conditional tape mark indicator time interval is about 10 seconds.

4. The data storage device of claim 1, wherein said computer readable program code further comprises a series of computer readable program steps to effect:

receiving a second command at a third time to record second information on said data storage medium, wherein the time interval between said second time and said third time is less than said deferred conditional tape mark indicator time interval;

receiving said second information;

resetting said first conditional deferred tape mark indicator;

moving said data storage medium in a first direction;

recording said second information on said moving data storage medium;

receiving a second deferred conditional write tape mark command;

setting a second deferred conditional tape mark indicator at a fourth time;

moving said data storage medium only in said first direction during the time interval between said first time and said fourth time.

5. The data storage device of claim 4, wherein said second information comprises:

a second header label group;

second data; and a second trailer label group.

6. The data storage device of claim 5, wherein said computer readable program code further comprises a series of computer readable program steps to effect:

writing said second header label group to said moving data storage medium adjacent said third tape mark;

writing a fourth tape mark to said moving data storage medium adjacent said second header label group;

writing said second data to said moving data storage medium adjacent said fourth tape mark;

writing a fifth tape mark to said moving data storage medium adjacent said second data;

writing said second trailer label group to said moving data storage medium adjacent said fifth tape mark; and writing a sixth tape mark to said moving data storage medium adjacent said second trailer label group.

7. The data storage device of claim 1, wherein said computer readable program code further comprises a series of computer readable program steps to effect:

receiving a second command, wherein said second command causes motion of said data storage medium in a second direction or causes synchronization of said data storage medium;

resetting said first deferred conditional tape mark indicator;

disposing a double tape mark on said data storage medium by writing a fourth tape mark adjacent said third tape mark;

moving said data storage medium in a second direction;

positioning said read/write head between said third tape mark and said fourth tape mark.

8. The data storage device of claim 7, wherein said computer readable program code further comprises a series of computer readable program steps to effect:

determining if said double tape mark was successfully written to said data storage medium;

determining if said read/write head was successfully positioned between said third tape mark and said fourth tape mark.

9. The data storage device of claim 8, wherein said double tape mark was not successfully written to said data storage medium, and wherein said read/write head was successfully repositioned between said third tape mark and said fourth tape mark, wherein said computer readable program code further comprises a series of computer readable program steps to effect indicating an UNWRITTEN DEFERRED TAPE MARK error message.

10. The data storage device of claim 8, wherein said double tape mark was successfully written to said data storage medium, and wherein said read/write head was not successfully repositioned between said third tape mark and said fourth tape mark, wherein said computer readable program code further comprises a series of computer readable program steps to effect indicating a DATA CHECK/LOST POSITIONING error message.

11. The data storage device of claim 8, wherein said double tape mark was not successfully written to said data storage medium, and wherein said read/write head was not successfully repositioned between said third tape mark and said fourth tape mark, wherein said computer readable program code further comprises a series of computer readable program steps to effect:

indicating a DATA CHECK/LOST POSITIONING error message; and indicating an UNWRITTEN DEFERRED TAPE MARK error message.

12. A data storage and retrieval system comprising a data storage device, a data storage medium removeably disposed in said data storage device. and a host computer which provides first information to said data storage device, wherein said data storage device comprises a computer useable medium having computer readable program code disposed therein for recording information on a data storage medium storage medium, the computer readable program code comprising a series of computer readable program steps to effect:

receiving a first command to record first information on said data storage medium;

receiving said first information, wherein said first information comprises a first header label group, first data, and a first trailer label group;

moving said data storage medium in a first direction;

recording said first information on said moving data storage medium beginning at a first time;

receiving a first deferred conditional write tape mark command;

setting a first deferred conditional tape mark indicator at a second time;

writing said first header label group to said moving data storage medium;

writing a first tape mark adjacent said first header label group;

writing said first data adjacent said first tape mark;

writing a second tape mark adjacent said first data;

writing said first trailer label group adjacent said second tape mark; and writing a third tape mark adjacent said first trailer label group;

specifying a deferred conditional tape mark indicator time interval; and maintaining said first deferred conditional tape mark indicator during said deferred conditional tape mark indicator time interval.

13. The data storage and retrieval system of claim 12, wherein said deferred conditional tape mark indicator time interval is between about 5 seconds and about 20 seconds.

14. The data storage and retrieval system of claim 13, wherein said deferred conditional tape mark indicator time interval is about 10 seconds.

15. The data storage and retrieval system of claim 12, wherein said computer readable program code further comprises a series of computer readable program steps to effect:

receiving a second command at a third time to record second information on said data storage medium, wherein the time interval between said second time and said third time is less than said deferred conditional tape mark indicator time interval;

receiving said second information from said host computer;

resetting said first conditional deferred tape mark indicator;

moving said data storage medium in said second direction;

recording said second information on said moving data storage medium;

receiving a second deferred conditional write tape mark command;

setting a second deferred conditional tape mark indicator at a fourth time;

wherein said data storage medium is moved only in said first direction during the time interval between said first time and said fourth time.

16. The data storage and retrieval system of claim 15, wherein said second information comprises:

a second header label group;

second data; and a second trailer label group.

17. The data storage and retrieval system of claim 16, wherein said computer readable program code further comprises a series of computer readable program steps to effect:

writing said second header label group to said moving data storage medium adjacent said third tape mark;

writing a fourth tape mark to said moving data storage medium adjacent said second header label group;

writing said second data to said moving data storage medium adjacent said fourth tape mark;

writing a fifth tape mark to said moving data storage medium adjacent said second data;

writing said second trailer label group to said moving data storage medium adjacent said fifth tape mark; and writing a sixth tape mark to said moving data storage medium adjacent said second trailer label group.

18. The data storage and retrieval system of claim 12, wherein said computer readable program code further comprises a series of computer readable program steps to effect:

receiving a second command, wherein said second command causes motion of said data storage medium in a second direction or causes synchronization of said data storage medium;

resetting said first deferred conditional tape mark indicator;

disposing a double tape mark on said data storage medium by writing a fourth tape mark adjacent said third tape mark;

moving said data storage medium in a second direction;

positioning said read/write head between said third tape mark and said fourth tape mark.

19. The data storage and retrieval system of claim 18, wherein said computer readable program code further comprises a series of computer readable program steps to effect:

determining if said double tape mark was successfully written to said data storage medium;

determining if said read/write head was successfully positioned between said third tape mark and said fourth tape mark.

20. The data storage and retrieval system of claim 19, wherein said double tape mark was not successfully written to said data storage medium, and wherein said read/write head was successfully repositioned between said third tape mark and said fourth tape mark, wherein said computer readable program code further comprises a series of computer readable program steps to effect indicating an UNWRITTEN DEFERRED TAPE MARK error message.

21. The data storage and retrieval system of claim 19, wherein said double tape mark was successfully written to said data storage medium, and wherein said read/write head was not successfully repositioned between said third tape mark and said fourth tape mark, wherein said computer readable program code further comprises a series of computer readable program steps to effect indicating a DATA CHECK/LOST POSITIONING error message.

22. The data storage and retrieval system of claim 19, wherein said double tape mark was not successfully written to said data storage medium, and wherein said read/write head was not successfully repositioned between said third tape mark and said fourth tape mark, wherein said computer readable program code further comprises a series of computer readable program steps to effect:

indicating a DATA CHECK/LOST POSITIONING error message; and indicating an UNWRITTEN DEFERRED TAPE MARK error message.

23. A computer program product usable with a programmable computer processor having computer readable program code embodied therein for disposing information on a data storage medium using a data storage device comprising a read/write head, comprising:

computer readable program code which causes said programmable computer processor to receive a first command to record first information on said data storage medium;

computer readable program code which causes said programmable computer processor to receive said first information, wherein said first information comprises a first header label group, first data, and a first trailer label group;

computer readable program code which causes said programmable computer processor to move said data storage medium in a first direction;

computer readable program code which causes said programmable computer processor to record said first information on said moving data storage medium beginning at a first time;

computer readable program code which causes said programmable computer processor to receive a first deferred conditional write tape mark command;

computer readable program code which causes said programmable computer processor to set a first deferred conditional tape mark indicator at a second time;

computer readable program code which causes said programmable computer processor to write said first header label group to said moving data storage medium;

computer readable program code which causes said programmable computer processor to write a first tape mark adjacent said first header label group;

computer readable program code which causes said programmable computer processor to write said first data adjacent said first tape mark;

computer readable program code which causes said programmable computer processor to write a second tape mark adjacent said first data;

computer readable program code which causes said programmable computer processor to write said first trailer label group adjacent said second tape mark;

computer readable program code which causes said programmable computer processor to write a third tape mark adjacent said first trailer label group;

computer readable program code which causes said programmable computer processor to specify a deferred conditional tape mark indicator time interval; and computer readable program code which causes said programmable computer processor to maintain said first deferred conditional tape mark indicator during said deferred conditional tape mark indicator time interval.

24. The computer program product of claim 23, wherein said deferred conditional tape mark indicator time interval is between about 5 seconds and about 20 seconds.

25. The computer program product of claim 24, wherein said deferred conditional tape mark indicator time interval is about 10 seconds.

26. The computer program product of claim 23, further comprising:

computer readable program code which causes said programmable computer processor to receive a second command at a third time to record second information on said data storage medium, wherein the time interval between said second time and said third time is less than said deferred conditional tape mark indicator time interval;

computer readable program code which causes said programmable computer processor to receive said second information;

computer readable program code which causes said programmable computer processor to reset said first conditional deferred tape mark indicator;

computer readable program code which causes said programmable computer processor to move said data storage medium in said first direction;

computer readable program code which causes said programmable computer processor to record said second information on said moving data storage medium;

computer readable program code which causes said programmable computer processor to receive a second deferred conditional write tape mark command;

computer readable program code which causes said programmable computer processor to set a second deferred conditional tape mark indicator at a fourth time;

computer readable program code which causes said programmable computer processor to move said data storage medium only in said first direction during the time interval between said first time and said fourth time.

27. The computer program product of claim 26, wherein said second information comprises:

a second header label group;

second data; and a second trailer label group.

28. The computer program product of claim 27, further comprising:

computer readable program code which causes said programmable computer processor to write said second header label group to said moving data storage medium adjacent said third tape mark;

computer readable program code which causes said programmable computer processor to write a fourth tape mark to said moving data storage medium adjacent said second header label group;

computer readable program code which causes said programmable computer processor to write said second data to said moving data storage medium adjacent said fourth tape mark;

computer readable program code which causes said programmable computer processor to write a fifth tape mark to said moving data storage medium adjacent said second data;

computer readable program code which causes said programmable computer processor to write said second trailer label group to said moving data storage medium adjacent said fifth tape mark; and computer readable program code which causes said programmable computer processor to write a sixth tape mark to said moving data storage medium adjacent said second trailer label group.

29. The computer program product of claim 26, further comprising:

computer readable program code which causes said programmable computer processor to receive a second command, wherein said second command causes motion of said data storage medium in a second direction or causes synchronization of said data storage medium;

computer readable program code which causes said programmable computer processor to reset said first deferred conditional tape mark indicator;

computer readable program code which causes said programmable computer processor to dispose a double tape mark on said data storage medium by writing a fourth tape mark adjacent said third tape mark;

computer readable program code which causes said programmable computer processor to move said data storage medium in a second direction;

computer readable program code which causes said programmable computer processor to position said read/write head between said third tape mark and said fourth tape mark.

30. The computer program product of claim 29, further comprising:

computer readable program code which causes said programmable computer processor to determine if said double tape mark was successfully written to said data storage medium; and computer readable program code which causes said programmable computer processor to determine if said read/write head was successfully positioned between said third tape mark and said fourth tape mark.

31. The computer program product of claim 30, wherein said double tape mark was not successfully written to said data storage medium, and wherein said read/write head was successfully repositioned between said third tape mark and said fourth tape mark, further comprising computer readable program code which causes said programmable computer processor to a series of computer readable program steps to indicate an UNWRITTEN DEFERRED TAPE MARK error message.

32. The computer program product of claim 30, wherein said double tape mark was successfully written to said data storage medium, and wherein said read/write head was not successfully repositioned between said third tape mark and said fourth tape mark, further comprising computer readable program code which causes said programmable computer processor to a series of computer readable program steps to indicate a DATA CHECK/LOST POSITIONING error message.

33. The computer program product of claim 30, wherein said double tape mark was not successfully written to said data storage medium, and wherein said read/write head was not successfully repositioned between said third tape mark and said fourth tape mark, further comprising:

computer readable program code which causes said programmable computer processor to indicate a DATA CHECK/LOST POSITIONING error message; and computer readable program code which causes said programmable computer processor to indicate an UNWRITTEN DEFERRED TAPE MARK error message.

34. A method to dispose information on a data storage medium using a data storage device, comprising the steps of:

providing a first command instructing said data storage device to record first information on said data storage medium;

providing said first information to said data storage device, wherein said first information comprises a first header label group, first data, and a first trailer label group;

disposing said data storage medium in said data storage device;

moving said data storage medium in a first direction;

recording said first information beginning at a first time on said moving data storage medium;

issuing a first deferred conditional write tape command;

setting at a second time a first deferred conditional tape mark indicator;

writing said first header label group to said moving data storage medium;

writing a first tape mark adjacent said first header label group;

writing said first data adjacent said first tape mark;

writing a second tape mark adjacent said first data;

writing said first trailer label group adjacent said second tape mark;

writing a third tape mark adjacent said first trailer label group;

specifying a deferred conditional tape mark indicator time interval;

maintaining said first deferred conditional tape mark indicator during said deferred conditional tape mark indicator time interval.

35. The method of claim 34, wherein said deferred conditional tape mark indicator time interval is between about 5 seconds and about 20 seconds.

36. The method of claim 35, wherein said deferred conditional tape mark indicator time interval is about 10 seconds.

37. The method of claim 34, further comprising the steps of:

providing a second command at a third time instructing said data storage device to record second information on said data storage medium, wherein the time interval between said second time and said third time is less than said deferred conditional tape mark indicator time interval;

providing said second information to said data storage device;

resetting said first conditional deferred tape mark indicator;

recording said second information on said moving data storage medium;

issuing a second deferred conditional write tape mark command;

setting a second deferred conditional tape mark indicator at a fourth time;

moving said data storage medium only in said first direction during the time interval between said first time and said fourth time.

38. The method of claim 37, wherein said second information comprises:

a second header label group;

second data; and a second trailer label group.

39. The method of claim 38, further comprising the steps of:

writing said second header label group to said moving data storage medium adjacent said third tape mark;

writing a fourth tape mark to said moving data storage medium adjacent said second header label group;

writing said second data to said moving data storage medium adjacent said fourth tape mark;

writing a fifth tape mark to said moving data storage medium adjacent said second data;

writing said second trailer label group to said moving data storage medium adjacent said fifth tape mark; and writing a sixth tape mark to said moving data storage medium adjacent said second trailer label group.

40. The method of claim 34, wherein said data storage device comprises a read/write head, further comprising the steps of:

providing a second command to said data storage drive, wherein said second command causes motion or synchronization of said data storage medium;

resetting said first deferred conditional tape mark indicator;

disposing a double tape mark on said data storage medium by writing a fourth tape mark adjacent said third tape mark;

moving said data storage medium in a second direction;

repositioning said read/write head between said third tape mark and said fourth tape mark.

41. The method of claim 40, further comprising the steps of:
   determining if said double tape mark was successfully written to said tape;
   determining if said read/write head was successfully positioned between said third tape mark and said fourth tape mark.

42. The method of claim 41, wherein said double tape mark was not successfully written to said tape, and wherein said read/write head was successfully repositioned between said third tape mark and said fourth tape mark, said method further comprising the step of indicating an UNWRITTEN DEFERRED TAPE MARK error message.

43. The method of claim 41, wherein said double tape mark was successfully written to said tape, and wherein said read/write head was not successfully repositioned between said third tape mark and said fourth tape mark, said method further comprising the step of indicating a DATA CHECK/LOST POSITIONING error message.

44. The method of claim 41, wherein said double tape mark was not successfully written to said tape, and wherein said read/write head was not successfully repositioned between said third tape mark and said fourth tape mark, said method further comprising the steps of:
   indicating a DATA CHECK/LOST POSITIONING error message; and
   indicating an UNWRITTEN DEFERRED TAPE MARK error message.

* * * * *